(12) United States Patent
Song

(10) Patent No.: US 11,737,396 B2
(45) Date of Patent: Aug. 29, 2023

(54) LIGHT MODULE FOR PLANT CULTIVATION AND PLANT CULTIVATION APPARATUS INCLUDING THE SAME

(71) Applicant: SEOUL VIOSYS CO., LTD., Gyeonggi-do (KR)

(72) Inventor: Hyun Su Song, Gyeonggi-do (KR)

(73) Assignee: Seoul Viosys Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/562,429

(22) Filed: Dec. 27, 2021

(65) Prior Publication Data

US 2022/0201939 A1 Jun. 30, 2022

Related U.S. Application Data

(60) Provisional application No. 63/247,915, filed on Sep. 24, 2021, provisional application No. 63/131,046, filed on Dec. 28, 2020.

(51) Int. Cl.
*A01G 7/04* (2006.01)
*F21V 23/00* (2015.01)
*F21Y 113/10* (2016.01)

(52) U.S. Cl.
CPC ........... *A01G 7/045* (2013.01); *F21V 23/007* (2013.01); *F21Y 2113/10* (2016.08)

(58) Field of Classification Search
CPC .... A01G 7/045; F21V 23/007; F21Y 2113/10
See application file for complete search history.

(56) References Cited

U.S. PATENT DOCUMENTS

| 10,820,532 | B2 * | 11/2020 | Kim | ..................... A01G 9/20 |
| 2011/0016785 | A1 * | 1/2011 | Yamada | ............... H05B 47/155 |
| | | | | 47/1.01 R |
| 2015/0223402 | A1 * | 8/2015 | Krijn | ..................... A01G 7/045 |
| | | | | 47/58.1 LS |

(Continued)

FOREIGN PATENT DOCUMENTS

| KR | 20150076838 A | 7/2015 |
| KR | 20160092135 A | 8/2016 |

(Continued)

OTHER PUBLICATIONS

International Search Report issued in corresponding International Application No. PCT/KR2021/019998, dated Apr. 11, 2022, English translation, 3 pages.

(Continued)

*Primary Examiner* — Tsion Tumebo
(74) *Attorney, Agent, or Firm* — LaBatt, LLC

(57) ABSTRACT

A light source module for plant cultivation includes at least one substrate, at least one growth light source and at least one auxiliary light source. The at least one growth light source and the at least one auxiliary light source are disposed on the at least one substrate. The growth light source emits growth light suitable for growing a plant. In addition, the auxiliary light source emits auxiliary light which is UV light suitable for increasing a phytochemical content of the plant. The growth light is white light. The auxiliary light source supplies the plant with the auxiliary light at a cumulative dose of 0.3 kJ/m² to less than 20.2 kJ/m² during cultivation of the plant.

20 Claims, 26 Drawing Sheets

(56) References Cited

U.S. PATENT DOCUMENTS

| | | | |
|---|---|---|---|
| 2018/0014374 A1* | 1/2018 | Rhodes | H05B 47/19 |
| 2018/0092308 A1* | 4/2018 | Barber, III | A23B 7/015 |
| 2020/0053856 A1* | 2/2020 | Barber | G01J 1/42 |
| 2020/0063931 A1* | 2/2020 | Song | F21V 23/003 |

FOREIGN PATENT DOCUMENTS

| | | |
|---|---|---|
| KR | 20190140148 A | 12/2019 |
| WO | 2020032677 A1 | 2/2020 |

OTHER PUBLICATIONS

Yawen Zeng, et al., Preventive and Therapeutic Role of Functional Ingredients of Barley Grass for Chronic Diseases in Human Beings, Oxidative Medicine and Cellular Longevity, Apr. 4, 2018 (publication date), vol. 2018, Article No. 3232080, pp. 1-15.

* cited by examiner

EXPERIMENT 9

EXPERIMENT 10

LIGHT MODULE FOR PLANT CULTIVATION AND PLANT CULTIVATION APPARATUS INCLUDING THE SAME

TECHNICAL FIELD

Embodiments described herein relate to a light source module for plant cultivation and a plant cultivation apparatus including the same.

BACKGROUND

Plants produce organic matter from carbon dioxide and water using light energy through photosynthesis. Plants use chemical energy of organic matter obtained through photosynthesis as nutrients for growth.

Plants contain phytochemicals that have beneficial effects on a subject in need thereof. Phytochemical levels of plants may vary depending on growth environments. For example, plants produce antioxidants to protect themselves against damage from oxidative stress.

In order to increase the phytochemical content of plants, plants may be treated with ultraviolet (UV) light which applies stress to the plants.

Different kinds of plants may have different kinds of phytochemicals. In addition, each of such phytochemicals may have a different efficacy in different kinds of plants.

However, conventional UV treatment does not consider different types of plants to be treated and different types of target phytochemicals. When a plant is subjected to the conventional UV treatment, effective increase in the content of a specific phytochemical may not take place.

SUMMARY

Embodiments of the present disclosure provide a light source module, which can efficiently increase the phytochemical content of a plant through treatment with UV light, and a plant cultivation apparatus including the same.

In addition, embodiments of the present disclosure provide a light source module, which can efficiently increase the content of specific phytochemicals in a plant, and a plant cultivation apparatus including the same.

In accordance with one aspect of the present disclosure, a light source module includes at least one substrate, at least one growth light source, and at least one auxiliary light source.

The at least one growth light source and the at least one auxiliary light source may be disposed on the at least one substrate.

The growth light source may emit growth light suitable for growth of a plant.

The auxiliary light source may emit auxiliary light, the auxiliary light being UV light suitable for increasing the content of phytochemicals in the plant.

The growth light may be white light.

In addition, the auxiliary light may be delivered at a cumulative dose of 0.3 kJ/m$^2$ to less than 20.2 kJ/m$^2$ to the plant during cultivation of the plant.

The phytochemicals may include at least one selected from among the total phenolic content, antioxidant capacity, lutonarin, and saponarin.

In one embodiment, the auxiliary light source may supply the plant with the auxiliary light at a cumulative dose of greater than 1.3 kJ/m$^2$ to less than 20.2 kJ/m$^2$ or 2.7 kJ/m$^2$ to 13.4 kJ/m$^2$ during cultivation of the plant.

In this embodiment, the auxiliary light from the auxiliary light source may increase the total phenolic content of the plant.

In another embodiment, the auxiliary light source may supply the plant with the auxiliary light at a cumulative dose of greater than 2.7 kJ/m$^2$ to less than 20.2 kJ/m$^2$ or 4 kJ/m$^2$ to 13.4 kJ/m$^2$ during cultivation of the plant.

In this embodiment, the auxiliary light supplied from the auxiliary light source may increase the antioxidant capacity of the plant.

In a further embodiment, the auxiliary light source may supply the plant with the auxiliary light at a cumulative dose of greater than 2.7 kJ/m$^2$ to less than 13.4 kJ/m$^2$ or 4 kJ/m$^2$ to 8.1 kJ/m$^2$ during cultivation of the plant.

In this embodiment, the auxiliary light supplied from the auxiliary light source may increase the content of lutonarin in the plant.

In yet another embodiment, the auxiliary light source may supply the plant with the auxiliary light at a cumulative dose of 0.3 kJ/m$^2$ to 13.4 kJ/m$^2$ during cultivation of the plant.

In this embodiment, the auxiliary light supplied from the auxiliary light source may increase the content of saponarin in the plant.

The at least one growth light source may include at least one first growth light source emitting the white light and at least one additional growth light source.

Here, the at least one additional growth light source may include at least one selected from among at least one second growth light source emitting red light and at least one third growth light source emitting blue light.

The auxiliary light may be UV light having a peak in the wavelength range of 280 nm to 320 nm.

The plant may be barley sprout.

In accordance with another aspect of the present disclosure, a plant cultivation apparatus provides a space in which the plant is cultivated.

In addition, the plant cultivation apparatus includes the light source module including the substrate, the at least one growth light source, and the at least one auxiliary light source according to the present disclosure.

The plant cultivation apparatus may further include at least one selected from among a tray supporting the plant during cultivation of the plant, a moisture supply unit supplying moisture to the plant, and a controller controlling operation of the light source module.

According to one or more embodiments of the present disclosure, a light source module includes at least one substrate, and at least one growth light source and at least one auxiliary light source disposed on the at least one substrate. The at least one growth light source emits growth light suitable for growing a selected plant. The at least one auxiliary light source emits auxiliary light. The auxiliary light being UV light suitable for increasing a content of at least one phytochemical in the selected plant. The at least one growth light is white light. The at least one auxiliary light source supplies the selected plant with the auxiliary light having a predetermined cumulative dose that ranges from 0.3 kJ/m$^2$ to less than 20.2 kJ/m$^2$ during cultivation of the selected plant.

In at least one variant, the auxiliary light increases the content of the at least one phytochemical including at least one selected from among a total phenolic content, an antioxidant capacity, lutonarin, saponarin.

In another variant, the predetermined cumulative dose of the auxiliary light further includes a first range that is greater than 1.3 kJ/m$^2$ to less than 20.2 kJ/m$^2$ or a second range that is from 2.7 kJ/m$^2$ to 13.4 kJ/m$^2$. The first range or the second range of the predetermined cumulative dose of the auxiliary light is supplied during cultivation of the selected plant to increase the total phenolic content of the selected plant.

In another variant, the predetermined cumulative dose further includes a third range that is greater than 2.7 kJ/m$^2$ to less than 20.2 kJ/m$^2$ or a fourth range that is from 4 kJ/m$^2$ to 13.4 kJ/m$^2$.

The third range or the fourth range of the predetermined cumulative dose of the auxiliary light is supplied during cultivation of the selected plant to increase the antioxidant capacity of the selected plant.

In another variant, the predetermined cumulative dose further includes a second range that is greater than 2.7 kJ/m$^2$ to less than 13.4 kJ/m$^2$ or a fifth range that is from 4 kJ/m$^2$ to 8.1 kJ/m$^2$. The second range or the fifth range of the predetermined cumulative dose of the auxiliary light is supplied during cultivation of the selected plant to increase a content of lutonarin in the selected plant.

In another variant, the predetermined cumulative dose includes a sixth range that is from 0.3 kJ/m$^2$ to 13.4 kJ/m$^2$ and the sixth range of the predetermined cumulative dose of the auxiliary light is supplied during cultivation of the selected plant to increase a content of saponarin in the selected plant.

In another variant, the at least one growth light source further comprises at least one first growth light source emitting the white light. At least one additional growth light source includes at least one second growth light source emitting red light, at least one third growth light source emitting blue light, or both.

In another variant, the auxiliary light is UV light having a peak in a wavelength range of 280 nm to 320 nm.

In another variant, the selected plant includes barley sprout.

According to one or more embodiments of the present disclosure, a plant cultivation apparatus includes a light source module emitting growth light and auxiliary light to a space for plant cultivation and a controller controlling operation of the light source module. The light source module includes at least one substrate, at least one growth light source and at least one auxiliary light source disposed on the at least one substrate. The at least one growth light source emits the growth light suitable for growing a selected plant. The at least one auxiliary light source emits the auxiliary light. The auxiliary light is UV light suitable for increasing a content of at least one phytochemical in the selected plant. The at least one growth light is white light. The at least one auxiliary light source supplies the selected plant with the auxiliary light at a predetermined cumulative dose that ranges from 0.3 kJ/m$^2$ to less than 20.2 kJ/m$^2$ during cultivation of the selected plant.

In at least one variant, the plant cultivation apparatus further includes a tray supporting the selected plant during cultivation of the plant, a moisture supply unit supplying moisture to the selected plant, or both.

In another variant, the auxiliary light increases the content of the at least one phytochemical including at least one selected from among a total phenolic content, an antioxidant capacity, lutonarin, and saponarin.

In another variant, the predetermined cumulative dose further includes a first range of greater than 1.3 kJ/m$^2$ to less than 20.2 kJ/m$^2$ or a second range that is from 2.7 kJ/m$^2$ to 13.4 kJ/m$^2$. The first range or the second range of the predetermined cumulative dose of the auxiliary light is supplied during cultivation of the selected plant to increase the total phenolic content of the selected plant.

In another variant, the predetermined cumulative dose further includes a third range of greater than 2.7 kJ/m$^2$ to less than 20.2 kJ/m$^2$ or a fourth range that is from 4 kJ/m$^2$ to 13.4 kJ/m$^2$. The third range or the fourth range of the predetermined cumulative dose of the auxiliary light is supplied during cultivation of the selected plant to increase the antioxidant capacity of the selected plant.

In another variant, the predetermined cumulative dose further includes a second range of greater than 2.7 kJ/m$^2$ to less than 13.4 kJ/m$^2$ or a fifth range that is from 4 kJ/m$^2$ to 8.1 kJ/m$^2$. The second range or the fifth range of the predetermined cumulative dose of the auxiliary light is supplied during cultivation of the selected plant to increase a content of lutonarin in the selected plant.

In another variant, the cumulative dose includes a sixth range that is from 0.3 kJ/m$^2$ to 13.4 kJ/m$^2$, and the sixth range of the predetermined cumulative dose of the auxiliary light is supplied during cultivation of the plant to increase a content of saponarin in the selected plant.

In another variant, the at least one growth light source includes at least one first growth light source emitting the white light. At least one additional growth light source includes at least one second growth light source emitting red light, at least one third growth light source emitting blue light, or both.

In another variant, the auxiliary light is UV light having a peak in a wavelength range of 280 nm to 320 nm.

In another variant, the selected plant includes barley sprout.

According to one or more embodiments of the present disclosure, a plant cultivation system includes at least one substrate, and at least one growth light source and at least one auxiliary light source disposed on the at least one substrate. The at least one growth light source emits growth light suitable for growing a selected plant. The at least one auxiliary light source emits auxiliary light, the auxiliary light being UV light suitable for increasing a content of phytochemicals in the selected plant. The at least one growth light is white light. The at least one auxiliary light source supplies the selected plant with the auxiliary light at a predetermined cumulative dose of 0.3 kJ/m$^2$ to less than 20.2 kJ/m$^2$ during cultivation of the selected plant. The at least one growth light source is arranged relative to the at least one auxiliary light source in a first pattern. The at least one growth light source and the at least one auxiliary light source are arranged relative to the at least one substrate in a second pattern.

In accordance with another aspect of the present disclosure, a plant cultivation system comprising at least one substrate and at least one growth light source and at least one auxiliary light source disposed on the at least one substrate. The growth light source emits growth light suitable for growing a plant. The auxiliary light source emits auxiliary light, the auxiliary light being UV light suitable for increasing the content of phytochemicals in the plant. The growth light is white light. And the auxiliary light source supplies the plant with the auxiliary light at a cumulative dose of 0.3 kJ/m$^2$ to less than 20.2 kJ/m$^2$ during cultivation of the plant.

The light source module according to the present disclosure and the plant cultivation apparatus including the same can efficiently increase the phytochemical content of a plant through treatment with UV light.

In addition, the light source module according to the present disclosure and the plant cultivation apparatus including the same can efficiently increase the content of specific phytochemicals in a plant through adjustment of the cumulative dose of UV light delivered to the plant.

BRIEF DESCRIPTION OF THE DRAWINGS

The embodiments set forth in the drawings are illustrative and exemplary in nature and are not intended to limit the disclosure. The following detailed description of the illustrative embodiments can be understood when read in conjunction with the following drawings, where like structures are indicated by like reference numerals and in which.

DETAILED DESCRIPTION

Figure 1:
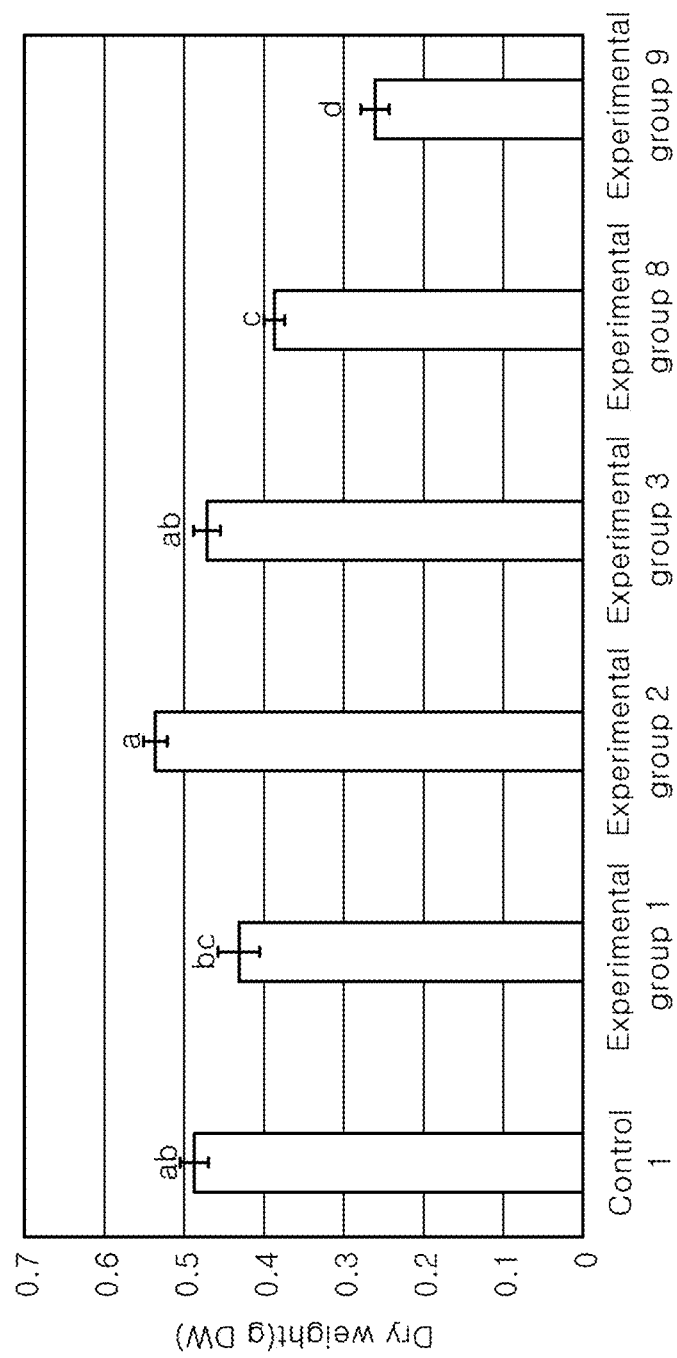
FIG. 1 is a graph showing results of measuring dry weight of barley sprout depending on a cumulative dose of auxiliary light according to Experiment 1.

Hereinafter, embodiments of the present disclosure will be described with reference to the accompanying drawings. It should be understood that the embodiments are provided for complete disclosure and thorough understanding of the present disclosure by those skilled in the art. Therefore, the present disclosure is not limited to the following embodiments and may be embodied in different ways. In addition, the drawings may be exaggerated in width, length, and thickness of components for descriptive convenience and clarity only. Like components will be denoted by like reference numerals throughout the specification.

Hereinafter, embodiments of the present disclosure will be described with reference to the accompanying drawings.

Experiments were conducted to determine influence of treatment with UV light as auxiliary light on the growth and a phytochemical content of a plant.

Specifically, the growth and phytochemical content of plant samples grown under treatment with growth light alone or a combination of growth light and auxiliary light were measured.

The plant used in these experiments was barley sprout. In addition, the growth light used in these experiments was visible light that helps the plant grow.

Further, the auxiliary light used in these experiments was UV light for increasing the phytochemical content of the plant.

First, seeds of barley sprout were sterilized, transplanted into a tray, sprayed with water, and allowed to germinate in the dark for 3 days.

Then, the germinated seeds of barley sprout were subjected to treatment with the growth light alone or the combination of the growth light and the auxiliary light for 7 days, thereby cultivating barley sprout samples.

Here, the barley sprout samples were provided with an environment in which 16 hours of light period and 8 hours of dark period were alternated during cultivation for 7 days.

The growth light and the auxiliary light were supplied to the barley sprout samples during the light period. During cultivation for 7 days, the barley sprout samples were exposed to the growth light at a total irradiance of about 60 μmol/m$^2$/s. In addition, during cultivation for 7 days, multiple barley sprout groups were exposed to the auxiliary light at different cumulative doses. Here, the auxiliary light delivered to the barley sprout samples was UV light having a peak in the wavelength range of 280 nm to 320 nm.

In all the experiments, control groups (Control groups 1 to 3) were groups of barley sprout samples grown under treatment with the growth light alone without treatment with the auxiliary light. In addition, experimental groups were groups of barley sprout samples grown under treatment with combination of the growth light and the auxiliary light.

Specifically, Experimental group 1 was a group of barley sprout samples exposed to the auxiliary light at a cumulative dose of about 0.3 kJ/m$^2$. Experimental group 2 was a group of barley sprout samples exposed to the auxiliary light at a cumulative dose of about 0.7 kJ/m$^2$. Experimental group 3 was a group of barley sprout samples exposed to the auxiliary light at a cumulative dose of about 1.3 kJ/m$^2$. Experimental group 4 was a group of barley sprout samples exposed to the auxiliary light at a cumulative dose of about 2.7 kJ/m$^2$. Experimental group 5 was a group of barley sprout samples exposed to the auxiliary light at a cumulative dose of about 4 kJ/m$^2$. Experimental group 6 was a group of barley sprout samples exposed to the auxiliary light at a cumulative dose of about 8.1 kJ/m$^2$. Experimental group 7 was a group of barley sprout samples exposed to the auxiliary light at a cumulative dose of about 13.4 kJ/m$^2$. Experimental group 8 was a group of barley sprout samples exposed to the auxiliary light at a cumulative dose of about 20.2 kJ/m$^2$. Experimental group 9 was a group of barley sprout samples exposed to the auxiliary light at a cumulative dose of about 40.3 kJ/m$^2$.

Here, the cumulative dose of the auxiliary light delivered to the barley sprout samples refers to the cumulative dose of the auxiliary light emitted from a light source to a space in which the barley sprout samples were grown.

Experiment 1

Experiment 1 was aimed at determining changes in growth of barley sprout depending on the cumulative dose of the auxiliary light.

In Experiment 1, the dry weight of barley sprout depending on the cumulative dose of the auxiliary light was measured.

In Experiment 1, the dry weight of barley sprout was measured on control group 1 and experimental groups 1 to 3, 8, and 9.

FIG. 1 is a graph showing results of measuring the dry weight of barley sprout depending on the cumulative dose of the auxiliary light according to Experiment 1.

Referring to FIG. 1, there was no significant difference in dry weight between control group 1 and experimental groups 1 to 3.

The dry weight of barley sprout was higher in experimental groups 2 and 3 than in control group 1.

More specifically, the dry weight of barley sprout was slightly but insignificantly higher in experimental groups 2 and 3 than in control group 1.

In addition, the dry weight of barley sprout was slightly but insignificantly lower in Experimental group 1 than in Control group 1.

That is, barley sprout samples of Experimental groups 1 to 3 had similar growth to those of Control group 1.

However, the dry weight of barley sprout was significantly lower in Experimental groups 8 and 9 than in Control group 1, as shown in FIG. 1.

This means that treatment with the auxiliary light adversely affected normal growth of barley sprout samples in Experimental groups 8 and 9.

That is, Experiment 1 shows that exposure to the auxiliary light at a cumulative dose of 20.2 kJ/m$^2$ or greater causes reduction in growth efficiency of barley sprout.

Experiment 2

Similar to Experiment 1, Experiment 2 was aimed at determining changes in the growth of barley sprout depending on the cumulative dose of the auxiliary light. The dry weight of barley sprout was measured as the dry weight of barley sprout varies depending on the cumulative dose of the auxiliary light.

In Experiment 2, some barley sprout groups were exposed to the auxiliary light at a different cumulative dose than the cumulative dose used in Experiment 1.

In Experiment 2, the dry weight of barley sprout was measured on Control group 2 and Experimental groups 4 to 8.

Figure 2:
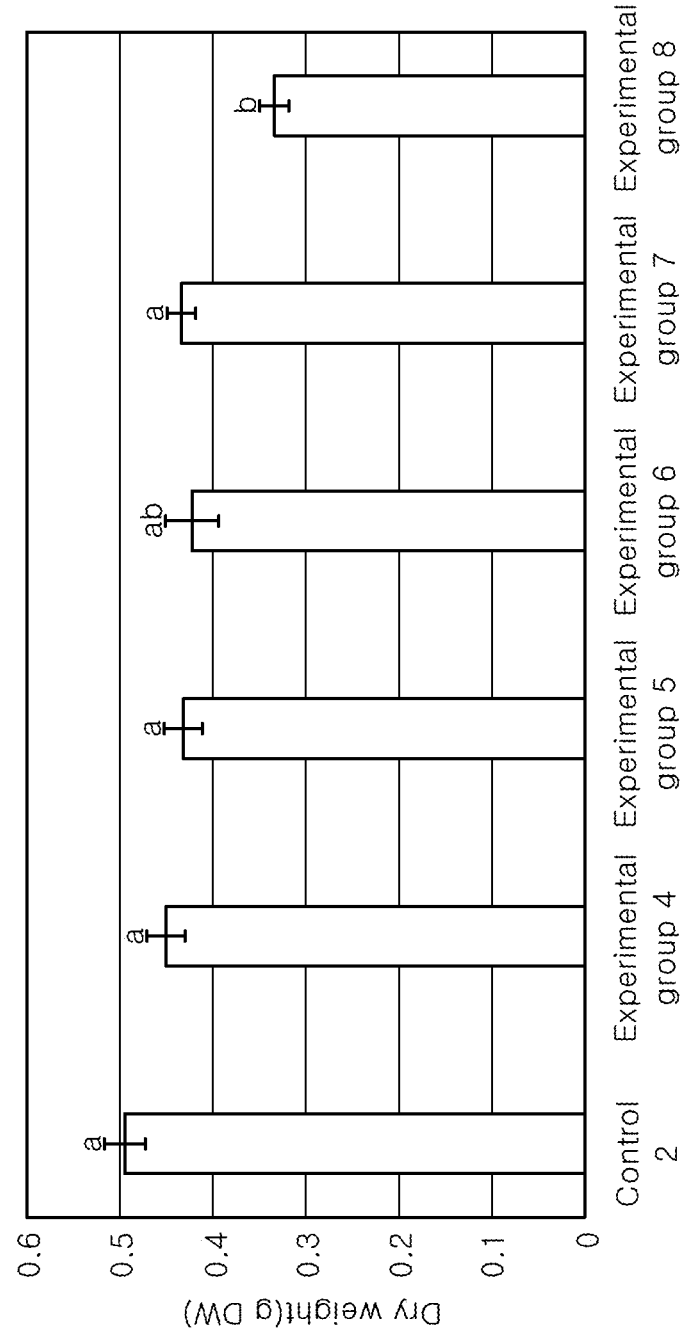
FIG. 2 is a graph showing results of measuring dry weight of barley sprout depending on a cumulative dose of the auxiliary light according to Experiment 2.

FIG. 2 is a graph showing results of measuring the dry weight of barley sprout depending on the cumulative dose of the auxiliary light according to Experiment 2.

Referring to FIG. 2, there was no significant difference in dry weight between control group 2 and experimental groups 4 to 7.

However, the dry weight of barley sprout was significantly lower in Experimental group 8 than in the dry weight of barley sprout in Control group 2.

From these results, it can be seen that, in the case of Experimental group 8, the treatment with the auxiliary light adversely affected the growth of barley sprout. For example, barley sprout samples of Experimental group 8 had poor growth or suffered damage, as compared with barley sprout samples not treated with the auxiliary light.

Experiment 2 shows that exposure to the auxiliary light at the cumulative dose of 20.2 kJ/m$^2$ or greater causes reduction in growth efficiency of barley sprout.

Figure 3:
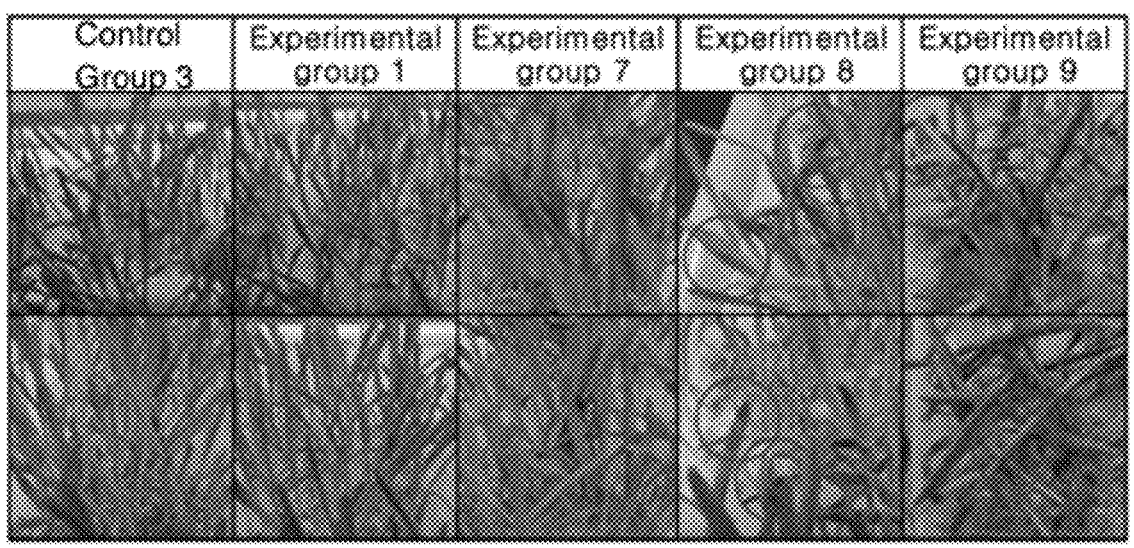
FIG. 3 is an image showing a degree of damage to barley sprout depending on the cumulative dose of the auxiliary light.

FIG. 3 is an image showing the degree of damage to barley sprout depending on the cumulative dose of the auxiliary light.

FIG. 3 shows barley sprout groups corresponding to Control group 3 and Experimental groups 1 and 7 to 8. Referring to FIG. 3, barley sprout samples of Control group 3 and Experimental groups 1 and 7 had normal growth without suffering damage, as shown in FIG. 3.

However, barley sprout samples of Experimental groups 8 and 9 suffered from yellowing or developed spots as shown in red circles.

That is, it can be seen that exposure to the auxiliary light at the cumulative dose of 20.2 kJ/m$^2$ or greater causes damage to barley sprout.

From Experiment 1, Experiment 2, and FIG. 1 to FIG. 3, it can be seen that the treatment with the auxiliary light at the cumulative dose of 20.2 kJ/m$^2$ or greater can cause damage to barley sprout.

That is, it can be seen that exposure to the auxiliary light at the cumulative dose of less than 20.2 kJ/m$^2$ does not adversely affect the growth of barley sprout. Furthermore, it can be seen that exposure to the auxiliary light at a cumulative dose of 13.4 kJ/m$^2$ or less does not adversely affect the growth of barley sprout.

Experiment 3

Experiment 3 was a first experiment to measure a total phenolic content of barley sprout depending on a cumulative dose of the auxiliary light delivered to barley sprout.

In Experiment 3, the total phenolic content of barley sprout was measured on Control group 1 and Experimental groups 1, 2, 3, 6, 8, and 9.

Figure 4:
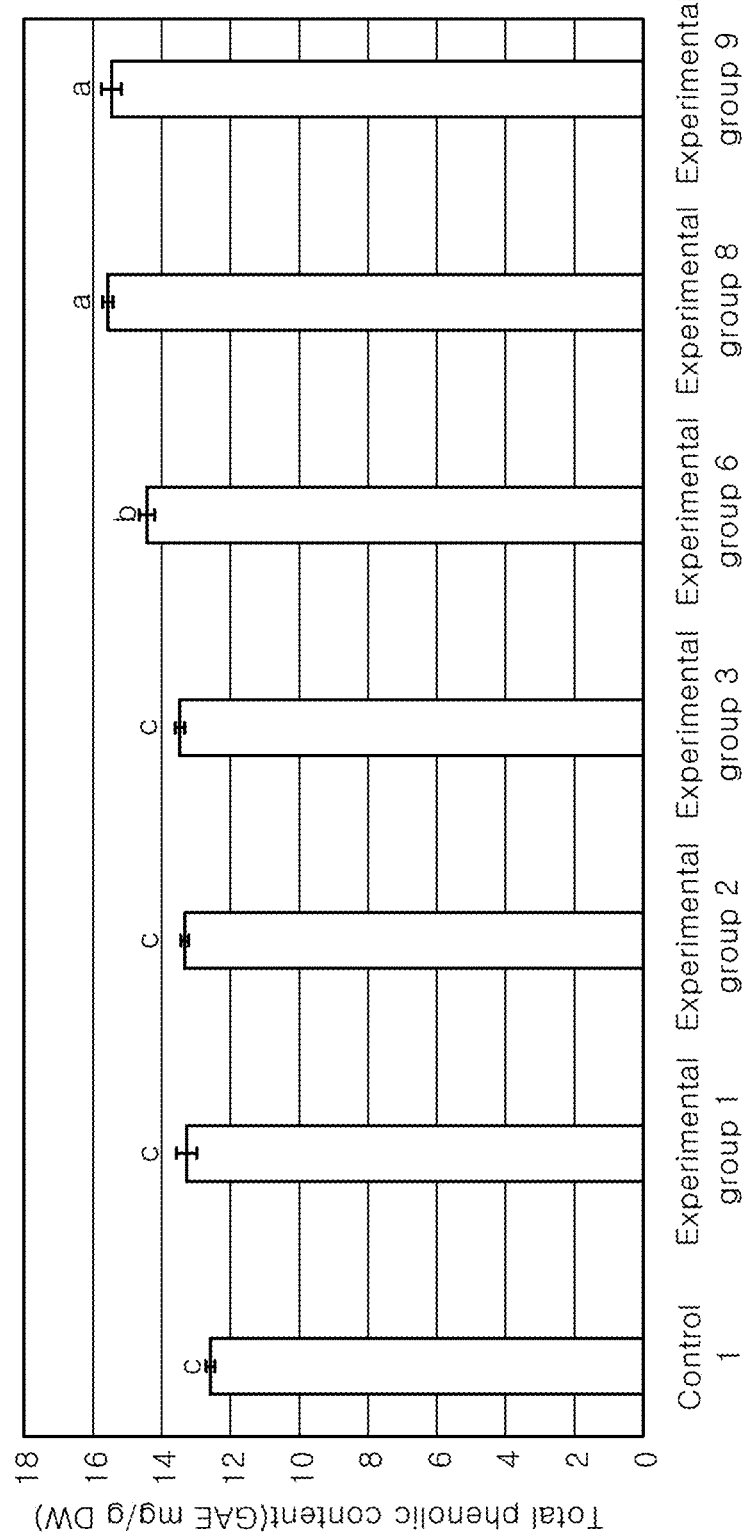
FIG. 4 is a graph showing results of measuring a total phenolic content of barley sprout depending on conditions of treatment with the auxiliary light according to Experiment 3.

FIG. 4 is a graph showing results of measuring the total phenolic content of barley sprout depending on conditions of treatment with the auxiliary light according to Experiment 3.

Referring to FIG. 4, the total phenolic content of barley sprout was slightly but insignificantly higher in Experimental groups 1 to 3 than in Control group 1.

However, the total phenolic content of barley sprout was significantly higher in Experimental groups 6, 8, and 9 than in Control group 1.

Experiment 3 shows that exposure to the auxiliary light at a cumulative dose of greater than 1.3 $kJ/m^2$ increases the total phenolic content of barley sprout. Furthermore, Experiment 3 shows that exposure to the auxiliary light at a cumulative dose of 8.1 $kJ/m^2$ or greater further increases the total phenolic content of barley sprout.

Experiment 4

Experiment 4 was a second experiment to measure the total phenolic content of barley sprout depending on the cumulative dose of the auxiliary light delivered to barley sprout.

In Experiment 4, the total phenolic content of barley sprout was measured on Control group 2 and Experimental groups 4, 5, 6, 7, and 8.

Figure 5:
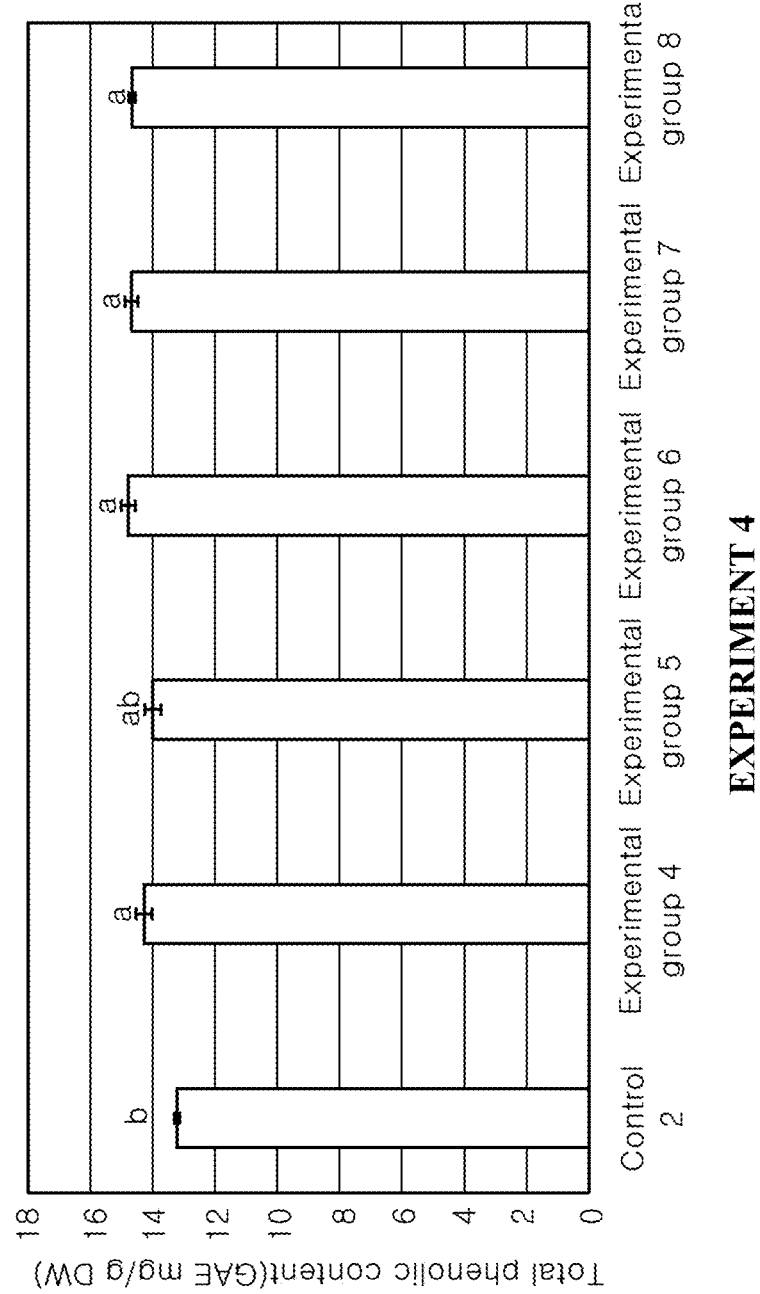
FIG. 5 is a graph showing results of measuring a total phenolic content of barley sprout depending on conditions of treatment with the auxiliary light according to Experiment 4.

FIG. 5 is a graph showing results of measuring the total phenolic content of barley sprout depending on conditions of treatment with the auxiliary light according to Experiment 4.

Referring to FIG. 5, the total phenolic content of barley sprout was higher in all of Experimental groups 4 to 8 than in Control group 2.

That is, Experiment 4 shows that exposure to the auxiliary light at a cumulative dose of 2.7 $kJ/m^2$ or greater increases the total phenolic content of barley sprout.

As such, taken together, the results of Experiments 3 and 4 indicate that the cumulative dose of the auxiliary light allowing increase in total phenolic content of barley sprout is greater than 1.3 $kJ/m^2$. Furthermore, the results of Experiments 3 and 4 indicate that the cumulative dose of the auxiliary light allowing increase in total phenolic content of barley sprout is 2.7 $kJ/m^2$ or greater.

Here, considering normal growth of barley sprout, a cumulative dose of the auxiliary light allowing increase in total phenolic content of barley sprout may be set within the range of greater than 1.3 $kJ/m^2$ to less than 20.2 $kJ/m^2$. Furthermore, a cumulative dose of the auxiliary light allowing increase in total phenolic content of barley sprout without sacrificing normal growth thereof may be in the range of 2.7 $kJ/m^2$ to 13.4 $kJ/m^2$.

Experiment 5

Experiment 5 was a first experiment to measure the antioxidant capacity of barley sprout depending on the cumulative dose of the auxiliary light delivered to barley sprout.

In Experiment 5, the antioxidant capacity of barley sprout was measured on control group 1 and experimental groups 1, 2, 3, 6, 8, and 9.

Figure 6:
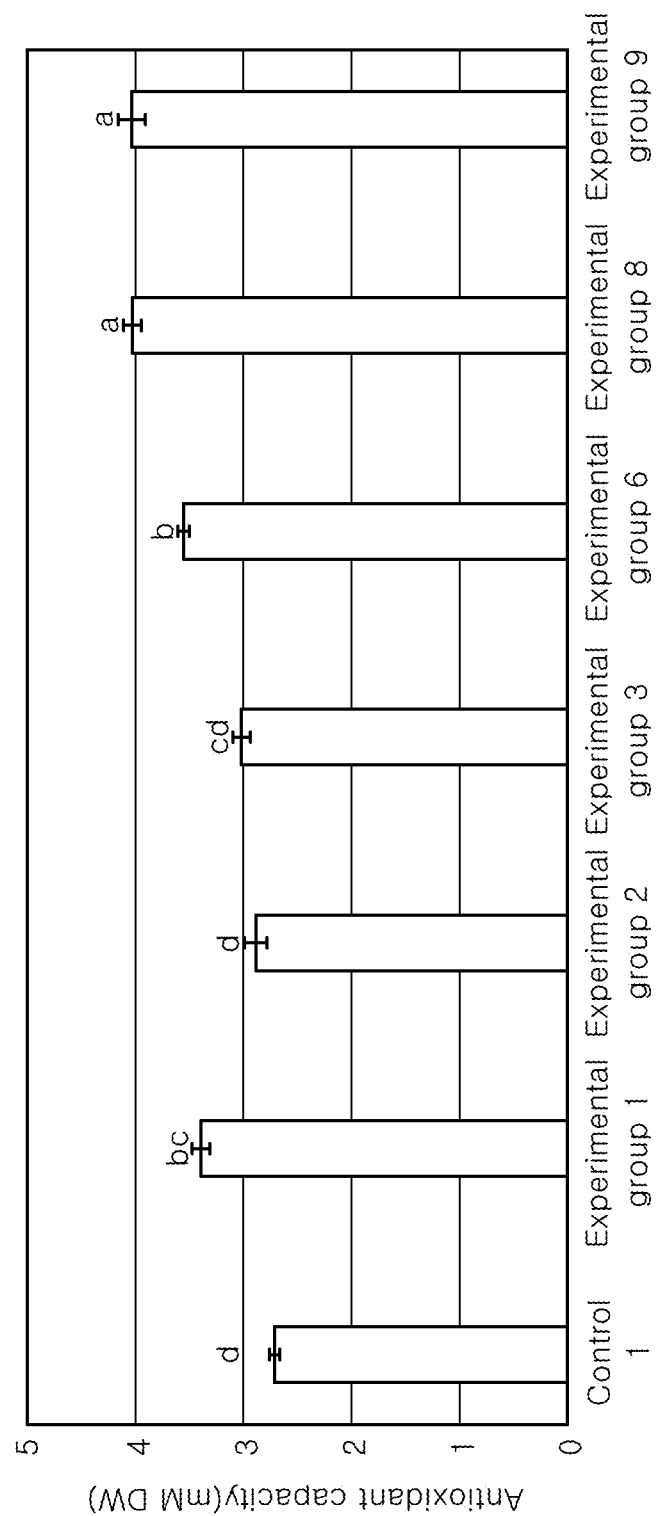
FIG. 6 is a graph showing results of measuring an antioxidant capacity of barley sprout depending on conditions of treatment with the auxiliary light according to Experiment 5.

FIG. 6 is a graph showing results of measuring the antioxidant capacity of barley sprout depending on conditions of treatment with the auxiliary light according to Experiment 5.

Referring to FIG. 6, the antioxidant capacity of barley sprout was significantly higher in experimental groups 1, 6, 8, and 9 than in control group 1.

However, there was no significant difference in antioxidant capacity between Experimental group 1 and experimental groups 2 and 3, which were exposed to the auxiliary light at a higher cumulative dose than Experimental group 1.

That is, Experiment 5 shows that exposure to the auxiliary light at a cumulative dose of greater than 1.3 $kJ/m^2$ increases the antioxidant capacity of barley sprout. Furthermore, Experiment 5 shows that exposure to the auxiliary light at a cumulative dose of 8.1 $kJ/m^2$ or greater increases the antioxidant capacity of barley sprout.

Experiment 6

Experiment 6 was a second experiment to measure an antioxidant capacity of barley sprout depending on the cumulative dose of the auxiliary light delivered to barley sprout.

In Experiment 6, the antioxidant capacity of barley sprout was measured on Control group 2 and Experimental groups 4 to 8.

Figure 7:
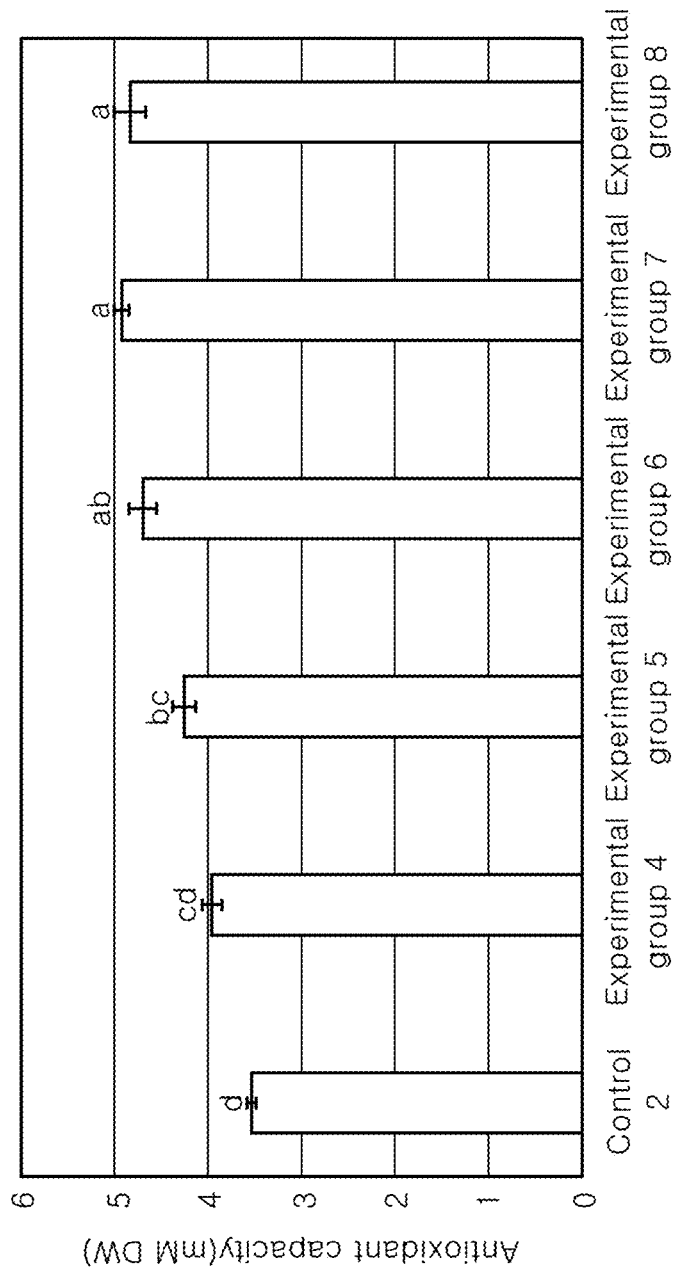
FIG. 7 is a graph showing results of measuring an antioxidant capacity of barley sprout depending on conditions of treatment with the auxiliary light according to Experiment 6.

FIG. 7 is a graph showing results of measuring the antioxidant capacity of barley sprout depending on conditions of treatment with the auxiliary light according to Experiment 6. Referring to FIG. 7, there was no significant difference in antioxidant capacity between Experimental group 4 and Control group 2. However, the antioxidant capacity of barley sprout was significantly higher in experimental groups 5 to 8 than in control group 2.

That is, Experiment 6 shows that exposure to the auxiliary light at a cumulative dose of greater than 2.7 $kJ/m^2$ increases the antioxidant capacity of barley sprout. Furthermore, Experiment 6 shows that exposure to the auxiliary light at a cumulative dose of 4 $kJ/m^2$ or greater further increases the antioxidant capacity of barley sprout.

As such, taken together, the results of Experiments 5 and 6 indicate that the cumulative dose of the auxiliary light allowing increase in antioxidant capacity of barley sprout is greater than 2.7 $kJ/m^2$. Furthermore, the results of Experiments 5 and 6 indicate that the cumulative dose of the auxiliary light allowing increase in antioxidant capacity of barley sprout is 4 $kJ/m^2$ or greater.

In addition, considering normal growth of barley sprout, a cumulative dose of the auxiliary light allowing increase in antioxidant capacity of barley sprout may be set within the range of greater than 2.7 $kJ/m^2$ to less than 20.2 $kJ/m^2$. Furthermore, a cumulative dose of the auxiliary light allowing antioxidant capacity of barley sprout to increase without sacrificing normal growth thereof may be in the range of 4 $kJ/m^2$ to 13.4 $kJ/m^2$.

Experiments 7 to 10 were aimed at determining influence of treatment with the auxiliary light on contents of specific phytochemicals in barley sprout. The specific phytochemicals measured in Experiments 7 to 10 were lutonarin and saponarin, which are polyphenol compounds.

Lutonarin and saponarin are known to have skin whitening, antioxidant, anti-cancer, and anti-inflammatory effects. In addition, lutonarin and saponarin are known to be also effective in relieving hangovers and improving alcoholic fatty liver. Further, saponarin is known to also have antidiabetic effects.

Experiment 7

Experiment 7 was a first experiment to measure a content of lutonarin in barley sprout depending on a cumulative dose of the auxiliary light delivered to barley sprout.

In Experiment 7, the content of lutonarin was measured on Control group 1 and Experimental groups 1, 2, 3, 6, 8, and 9.

Figure 8:
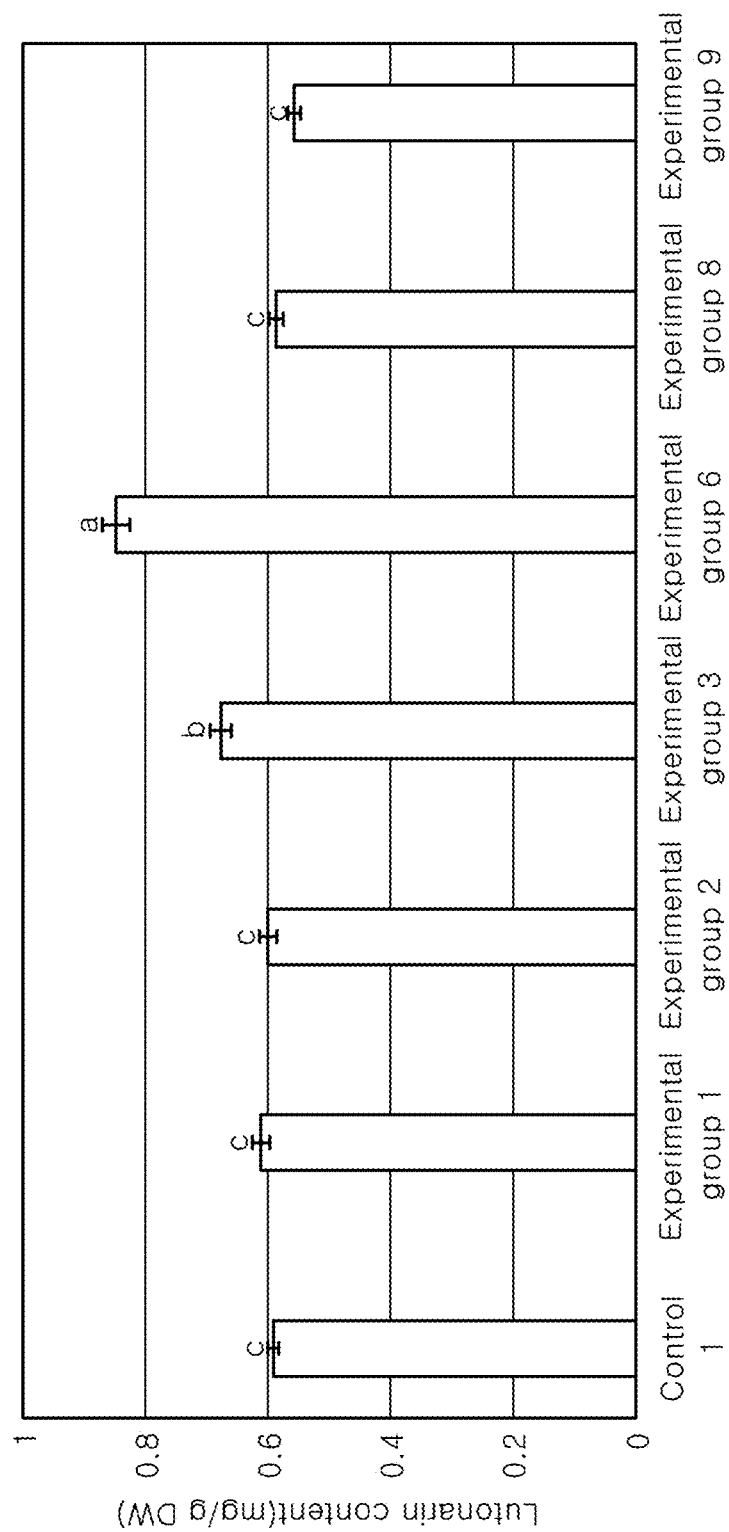
FIG. 8 is a graph showing results of measuring a content of lutonarin in barley sprout depending on conditions of treatment with the auxiliary light according to Experiment 7.

FIG. 8 is a graph showing results of measuring the content of lutonarin in barley sprout depending on treatment with the auxiliary light according to Experiment 7.

Referring to FIG. 8, the content of lutonarin in Experimental groups 1, 2, 8, and 9 was similar to that in Control group 1.

However, the content of lutonarin in Experimental groups 3 and 6 was significantly higher than that in Control group 1.

That is, Experiment 7 shows that exposure to the auxiliary light at the cumulative dose of greater than 0.7 kJ/m$^2$ to less than 20.2 kJ/m$^2$ increases the lutonarin content of barley sprout. Furthermore, Experiment 7 shows that exposure to the auxiliary light at a cumulative dose of 1.3 kJ/m$^2$ to 8.1 kJ/m$^2$ further increases the lutonarin content of barley sprout.

Experiment 8

Experiment 8 was a second experiment to measure the content of lutonarin in barley sprout depending on the cumulative dose of the auxiliary light delivered to barley sprout.

In Experiment 8, the content of lutonarin was measured on Control group 2 and Experimental groups 4 to 8.

Figure 9:
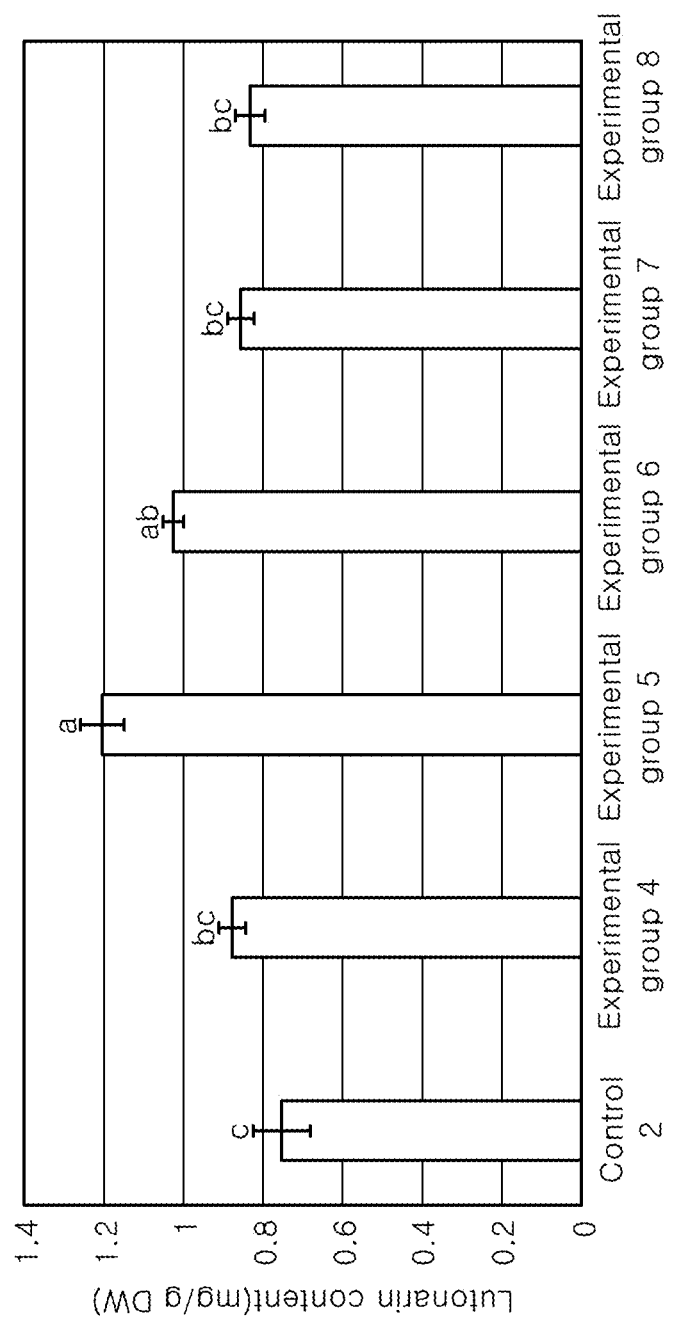
FIG. 9 is a graph showing results of measuring a content of lutonarin in barley sprout depending on conditions of treatment with the auxiliary light according to Experiment 8.

FIG. 9 is a graph showing results of measuring the content of lutonarin in barley sprout depending on treatment with the auxiliary light according to Experiment 8.

Referring to FIG. 9, Experimental groups 4 to 8 all had a higher lutonarin content than Control group 2.

Here, the content of lutonarin in Experimental group 4, 7, and 8 was similar to that in Control group 2.

However, the content of lutonarin in Experimental groups 5 and 6 was significantly higher than that in control group 2.

That is, Experiment 8 shows that exposure to the auxiliary light at the cumulative dose of greater than 2.7 kJ/m$^2$ to less than 13.4 kJ/m$^2$ increases the lutonarin content of barley sprout. Furthermore, Experiment 8 shows that exposure to the auxiliary light at the cumulative dose of 4 kJ/m$^2$ to 8.1 kJ/m$^2$ further increases the lutonarin content of barley sprout.

As such, taken together, the results of Experiments 7 and 8 indicate that the cumulative dose of the auxiliary light allowing increase in lutonarin content of barley sprout is in the range of greater than 2.7 kJ/m$^2$ to less than 13.4 kJ/m$^2$. Furthermore, the results of Experiments 7 and 8 indicate that a cumulative dose of the auxiliary light allowing increase in lutonarin content of barley sprout is in the range of 4 kJ/m$^2$ to 8.1 kJ/m$^2$.

The range of cumulative dose of the auxiliary light allowing an increase in lutonarin content of barley sprout falls within the range of cumulative dose of the auxiliary light allowing normal growth of barley sprout.

Experiment 9

Experiment 9 was a first experiment to measure a content of saponarin in barley sprout depending on the cumulative dose of the auxiliary light delivered to barley sprout.

In Experiment 9, the content of saponarin was measured on Control group 1 and Experimental groups 1, 2, 3, 6, 8, and 9.

Figure 10:
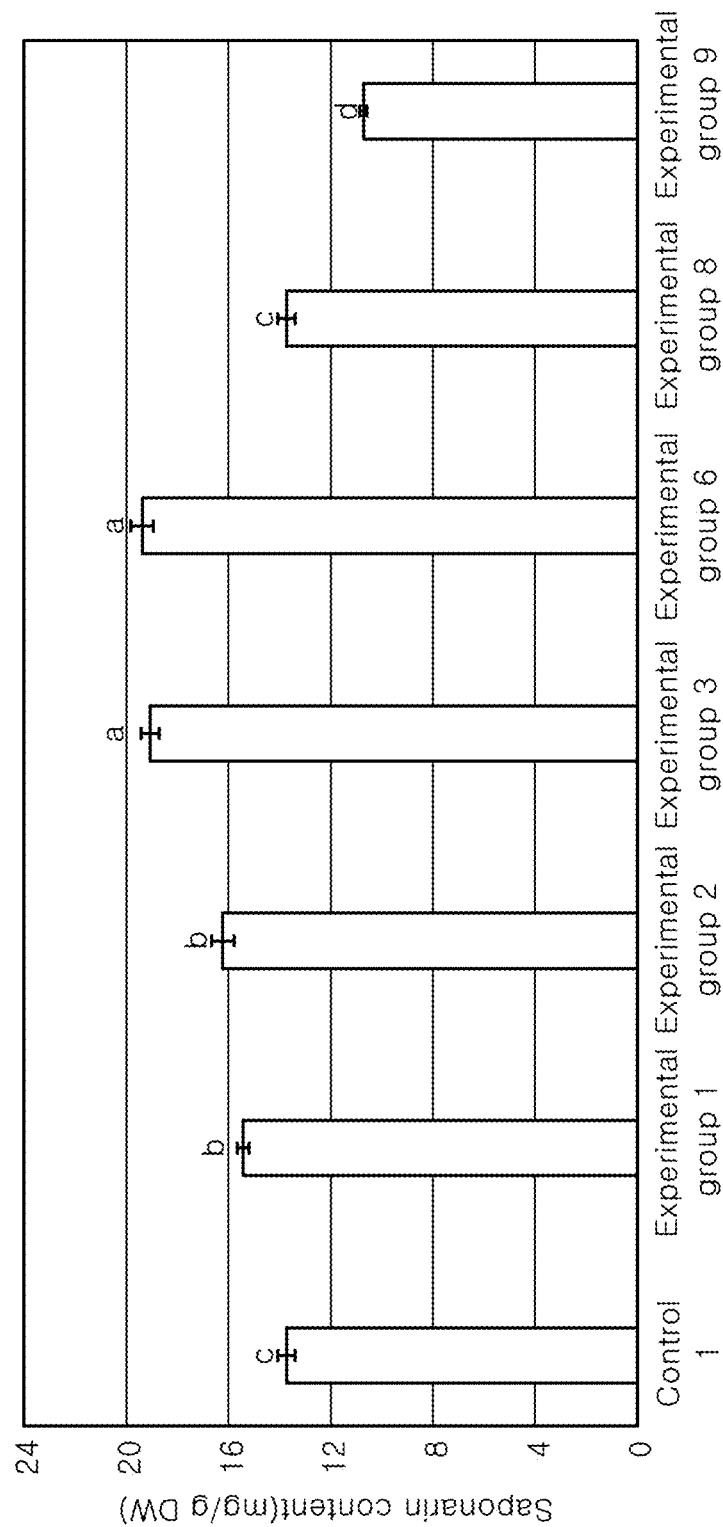
FIG. 10 is a graph showing results of measuring a content of saponarin in barley sprout depending on conditions of treatment with the auxiliary light according to Experiment 9.

FIG. 10 is a graph showing results of measuring the content of saponarin in barley sprout depending on conditions of treatment with the auxiliary light according to Experiment 9.

Referring to FIG. 10, the content of saponarin was significantly higher in Experimental groups 1, 2, 3, and 6 than that in Control group 1.

However, the content of saponarin in Experimental group 8 and 9 was similar to or lower than that in Control group 1.

That is, Experiment 9 shows that exposure to the auxiliary light at the cumulative dose of 0.3 kJ/m$^2$ to less than 20.2 kJ/m$^2$ can increase the saponarin content of barley sprout. Furthermore, Experiment 9 shows that exposure to the auxiliary light at the cumulative dose of 0.3 kJ/m$^2$ to 8.1 kJ/m$^2$ can further increase the saponarin content of barley sprout.

Experiment 10

Experiment 10 was a second experiment to measure a content of saponarin in barley sprout depending on the cumulative dose of the auxiliary light delivered to barley sprout.

In Experiment 10, the content of saponarin was measured on Control group 2 and Experimental groups 4 to 8.

Figure 11:
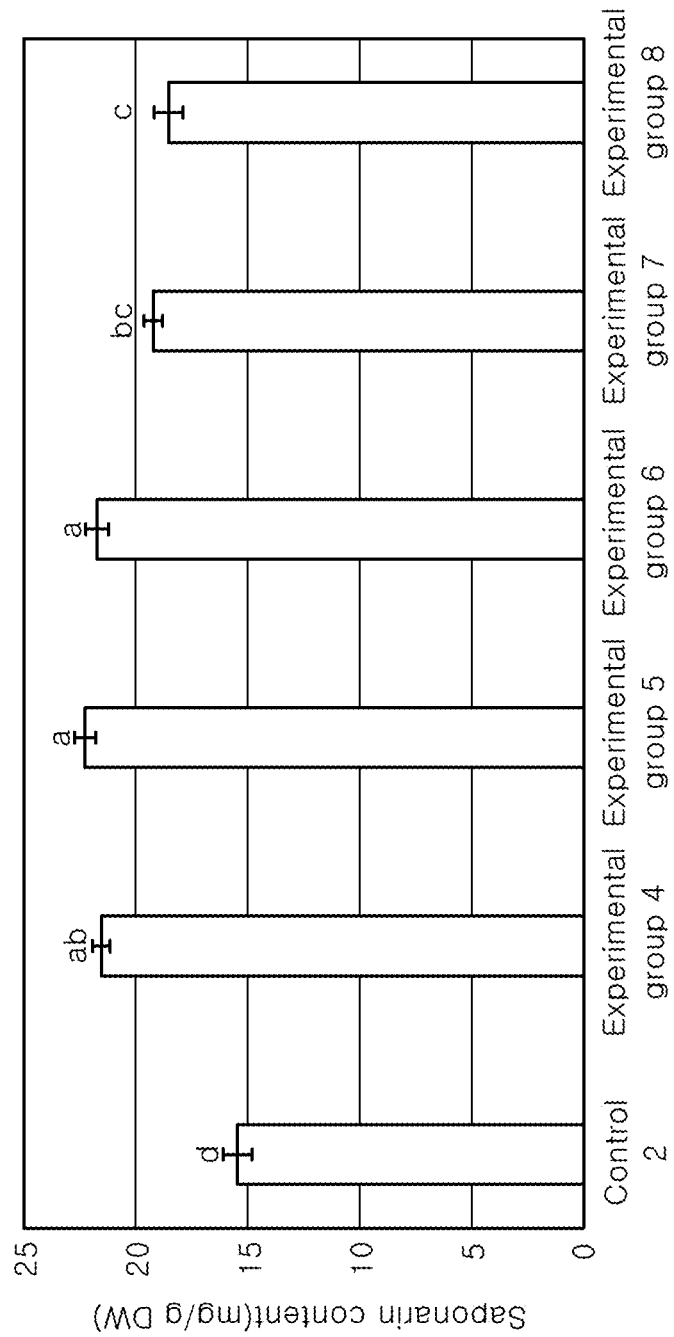
FIG. 11 is a graph showing results of measuring a content of saponarin in barley sprout depending on conditions of treatment with the auxiliary light according to Experiment 10.

FIG. 11 is a graph showing results of measuring the content of saponarin in barley sprout depending on conditions of treatment with the auxiliary light according to Experiment 10.

Referring to FIG. 11, the content of saponarin was significantly higher in Experimental groups 4 to 8 than that in Control group 2.

That is, Experiment 10 shows that exposure to the auxiliary light at a cumulative dose of 2.7 kJ/m$^2$ to 20.2 kJ/m$^2$ can increase the saponarin content of barley sprout. Furthermore, Experiment 10 shows that exposure to the auxiliary light at a cumulative dose of 2.7 kJ/m$^2$ to 13.4 kJ/m$^2$ can increase the saponarin content of barley sprout.

As such, taken together, the results of Experiments 9 and 10 indicate that a cumulative dose of the auxiliary light allowing increase in saponarin content of barley sprout is in the range of 0.3 kJ/m$^2$ to less than 20.2 kJ/m$^2$. Furthermore, the results of Experiments 9 and 10 indicates that a cumulative dose of the auxiliary light allowing increase in saponarin content of barley sprout is in the range of 0.3 kJ/m$^2$ to 13.4 kJ/m$^2$.

Here, considering normal growth of barley sprout, a cumulative dose of the auxiliary light allowing increase in saponarin content of barley sprout may be set within the range of 0.3 kJ/m$^2$ to less than 20.2 kJ/m$^2$. Furthermore, a cumulative dose of the auxiliary light allowing the increase in saponarin content without sacrificing normal growth of barley sprout may be in the range of 0.3 kJ/m$^2$ to 13.4 kJ/m$^2$.

Figure 12:
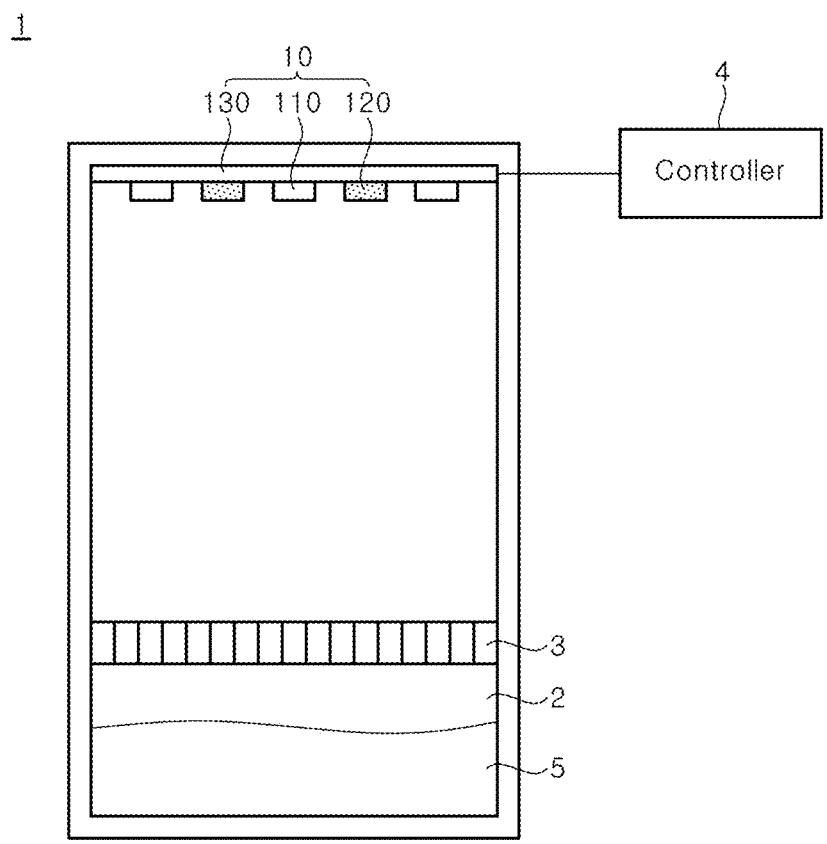
FIG. 12 is a schematic view of a plant cultivation apparatus according to one embodiment of the present disclosure.

FIG. 12 is an exemplary view of a plant cultivation apparatus according to one embodiment of the present disclosure.

FIG. 12 is a schematic sectional view of a plant cultivation apparatus 1 according to this embodiment. The plant cultivation apparatus 1 according to this embodiment provides a space for plant cultivation. In addition, the plant cultivation apparatus 1 according to this embodiment can improve a phytochemical content of a plant cultivated therein. Here, the plant may be barley sprout.

The plant cultivation apparatus 1 according to this embodiment may include a tray 3, a moisture supply unit 2, a light source module 10, and a controller 4.

The tray 3 allows seeds of barley sprout to germinate therein and supports barley sprout in an upright position to facilitate supply of moisture to the roots of the barley sprout.

The moisture supply unit 2 supplies moisture to the barley sprout cultivated in the tray 3. For example, the moisture supply unit 2 may be disposed under the tray 3 and may store a substance 5 that can supply moisture to the barley sprout, such as water. Alternatively, the moisture supply unit 2 may store a culture medium that can supply nutrients to the barley sprout.

Here, the barley sprout may be secured in the tray 3 with the roots thereof immersed in the water or culture solution stored in the moisture supply unit 2 to be supplied with moisture and nutrients.

The light source module 10 may supply growth light and auxiliary light to the plant. Here, the light source module 10 may emit the growth light and the auxiliary light to the space for plant cultivation to supply the plant with the growth light and the auxiliary light. That is, a cumulative light dose delivered to the plant refers to a cumulative dose of light emitted from the light source module 10 towards the space for plant cultivation.

The growth light is light suitable for growing the barley sprout. In addition, the auxiliary light is light suitable for increasing the phytochemical content of the barley sprout.

For example, the light source module 10 may supply the barley sprout with the growth light at a total irradiance of 60 $\mu mol/m^2/s$ during plant cultivation. In addition, the light source module 10 may supply the barley sprout with the auxiliary light during plant cultivation. The light source module 10 may supply the barley sprout with both the growth light and the auxiliary light during a light period. For example, the light period during which light is supplied to the barley sprout may be set to 16 hours and a dark period during which light is not supplied to the barley sprout may be set to 8 hours. During plant cultivation, the light period and the dark period are alternated with each other.

The light source module 10 may include a substrate 130, a growth light source 110 emitting the growth light, and an auxiliary light source 120 emitting the auxiliary light. The growth light source 110 and the auxiliary light source 120 may be operated simultaneously or may be operated individually.

FIG. 12 shows the plant cultivation apparatus 1 including a single light source module 10. However, it will be understood that the present disclosure is not limited thereto and two or more light source modules 10 of the plant cultivation apparatus 1 may be arranged as needed.

The plant cultivation apparatus 1 according to this embodiment may supply the barley sprout with the auxiliary light at a cumulative dose of 0.3 $kJ/m^2$ to less than 20.2 $kJ/m^2$ during plant cultivation, thereby increasing the phytochemical content of the barley sprout.

In addition, the plant cultivation apparatus 1 according to this embodiment may change the cumulative dose of the auxiliary light delivered to the barley sprout depending on purposes. That is, the plant cultivation apparatus 1 can increase the content of a specific target phytochemical through adjustment of the cumulative dose of the auxiliary light emitted from the light source module 10.

For example, the light source module 10 may supply the barley sprout with the auxiliary light at a cumulative dose of greater than 1.3 $kJ/m^2$ to less than 20.2 $kJ/m^2$ during plant cultivation to increase the total phenolic content of the barley sprout. Furthermore, the light source module 10 may supply the barley sprout with the auxiliary light at a cumulative dose of 2.7 $kJ/m^2$ to 13.4 $kJ/m^2$ during plant cultivation to further increase the total phenolic content of the barley sprout.

In addition, the light source module 10 may supply the barley sprout with the auxiliary light at a cumulative dose of greater than 2.7 $kJ/m^2$ to less than 2.02 $kJ/m^2$ during plant cultivation to improve the antioxidant capacity of the barley sprout. Furthermore, the light source module 10 may supply the barley sprout with the auxiliary light at a cumulative dose of 4 $kJ/m^2$ to 13.4 $kJ/m^2$ during plant cultivation to improve the antioxidant capacity of barley sprout.

As another example, the light source module 10 may supply the barley sprout with the auxiliary light at a cumulative dose of 0.3 $kJ/m^2$ to less than 2.02 $kJ/m^2$ during plant cultivation to increase the saponarin content of the barley sprout. Furthermore, the light source module 10 may supply the barley sprout with the auxiliary light at a cumulative dose of 0.3 $kJ/m^2$ to 13.4 $kJ/m^2$ during plant cultivation to increase the saponarin content of the barley sprout.

As further another example, the light source module 10 may supply the barley sprout with the auxiliary light at a cumulative dose of greater than 2.7 $kJ/m^2$ to less than 2.02 $kJ/m^2$ during plant cultivation to increase the lutonarin content of the barley sprout. Furthermore, the light source module 10 may supply the barley sprout with the auxiliary light at a cumulative dose of 4 $kJ/m^2$ to 8.1 $kJ/m^2$ during plant cultivation to increase the lutonarin content of the barley sprout.

The controller 4 may control operation of the light source module 10 based on an input signal or pre-stored data. Here, the input signal or the pre-stored data may include information about different types of target phytochemicals, information about the cumulative light dose corresponding to specific phytochemicals, information about different durations of the light period and the dark period, and the like.

The controller 4 may control an operation cycle of the light source module 10, the irradiance of the growth light, and the irradiance of the auxiliary light based on the input signal or the pre-stored data. For example, the controller 4 may control the irradiance of the growth light and the auxiliary light through adjustment of the numbers of growth light sources 110 and auxiliary light sources 120 put into operation. In addition, the controller 4 may control the irradiance of the growth light and the auxiliary light through adjustment of the magnitude of voltage or current supplied to the growth light source 110 and the auxiliary light source 120. In this way, the controller 4 may regulate the cumulative doses of the growth light and the auxiliary light delivered to the plant through control over the irradiance and operating time of the light source module 10. In the plant cultivation apparatus 1 according to this embodiment, the controller 4 and the light source module 10 are provided as independent components.

However, it will be understood that the configuration of the plant cultivation apparatus 1 is not limited thereto. For example, the substrate 130 of the light source module 10 may serve as the controller 4.

The plant cultivation apparatus 1 of FIG. 12 is merely by way of an example where the light source module 10 capable of increasing the phytochemical content of barley sprout cultivated can be used advantageously. That is, the light source module 10 according to the present disclosure may be used in other devices or space for cultivation of barley sprout to increase the phytochemical content of the barley sprout.

FIG. 13 to FIG. 33 relate to various embodiments of a light source module for plant cultivation, which can improve the growth and phytochemical content of barley sprout.

Now, various embodiments of a light source module used in the plant cultivation apparatus 1 of FIG. 12 and light delivered to barley sprout by the light source module will be described with reference to FIG. 13 to FIG. 33. In optical spectra related to various embodiments of the light, the x-axis represents a wavelength of the light and the y-axis represents light intensity. In addition, the values on the y-axis are relative values obtained by comparing light intensities at different wavelengths contained in the light.

Figure 13:
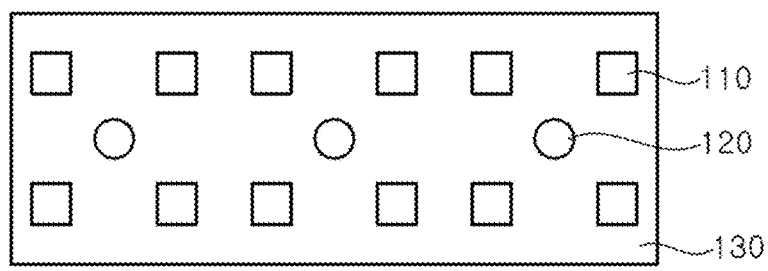
FIG. 13 is a schematic view of a light source module according to a first embodiment of the present disclosure.
Figure 14:
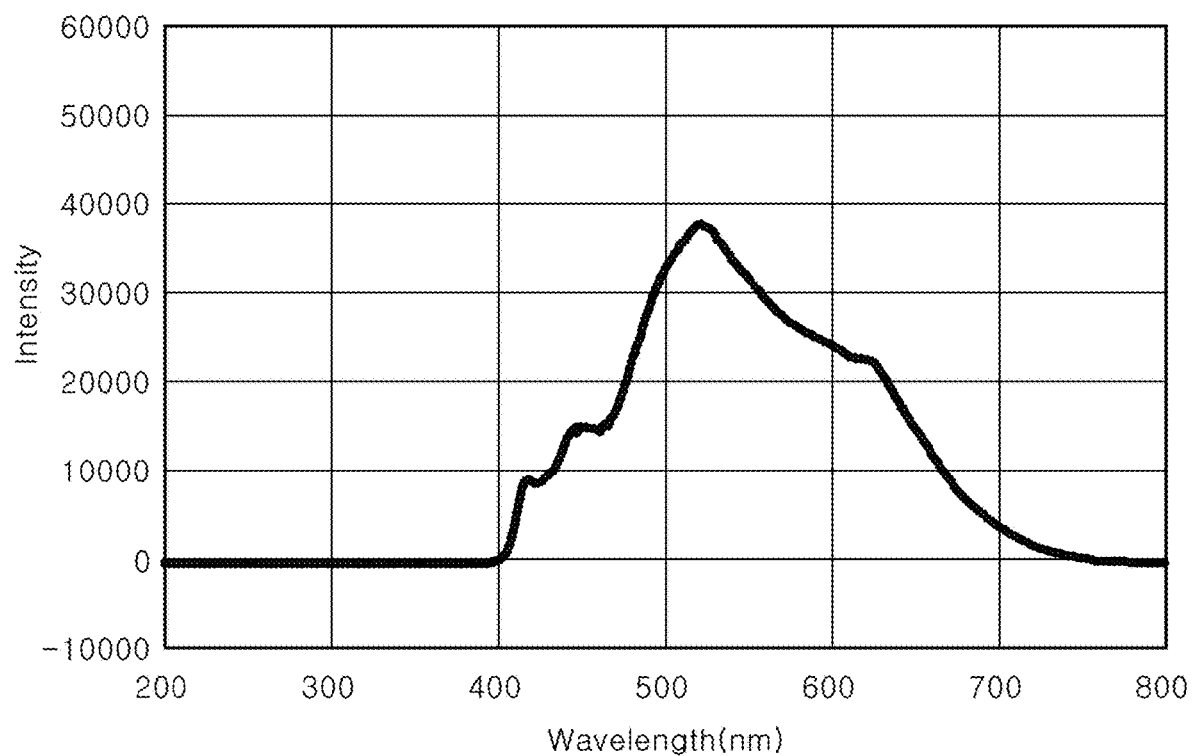
FIG. 14 is a spectrum of light emitted from a growth light source of the light source module according to the first embodiment.
Figure 15:
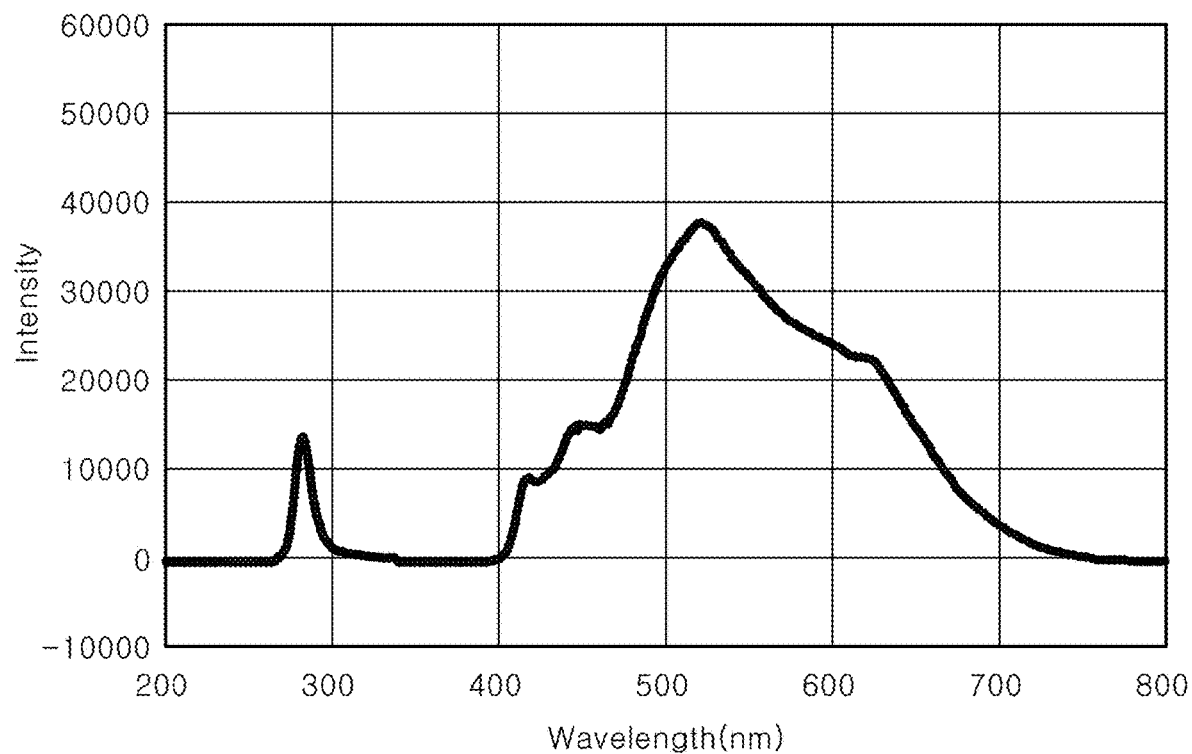
FIG. 15 is a spectrum of light emitted from the light source module according to the first embodiment.

FIG. 13 to FIG. 15 are exemplary views illustrating characteristics of a light source module according to a first embodiment of the present disclosure.

FIG. 13 is a schematic view of a light source module 11 according to the first embodiment of the present disclosure. FIG. 14 is a spectrum of light emitted from a growth light source 110 of the light source module 11 according to the first embodiment. FIG. 15 is a spectrum of light emitted from the light source module 11 according to the first embodiment.

Referring to FIG. 13, the light source module 11 according to the first embodiment may include a substrate 130, a growth light source 110, and an auxiliary light source 120.

The growth light source 110 supplies a plant with growth light suitable for growing the plant. The auxiliary light source 120 supplies the plant with auxiliary light suitable for increasing the phytochemical content of the plant. The growth light source 110 and the auxiliary light source 120 may be mounted on the substrate 130. In addition, the substrate 130 may be electrically connected to the growth light source 110 and the auxiliary light source 120 to supply power to the growth light source 110 and the auxiliary light source 120 therethrough.

Referring to FIG. 13, a plurality of growth light sources 110 and a plurality of auxiliary light sources 120 are mounted on the substrate 130. In addition, in some forms, each of the auxiliary light sources 120 is disposed between the growth light sources 110.

However, it will be understood that the present disclosure is not limited thereto and the numbers and arrangement of growth light sources 110 and auxiliary light sources 120 of the light source module 11 may vary as needed.

The plurality of growth light sources 110 and the plurality of auxiliary light sources 120 may be simultaneously operated. That is, the plurality of growth light sources 110 and the plurality of auxiliary light sources 120 may be simultaneously turned on/off.

Alternatively, the plurality of growth light sources 110 and the plurality of auxiliary light sources 120 may be operated independently of each other. That is, a growth light source 110 group including the plurality of growth light sources 110 and an auxiliary light source 120 group including the plurality of auxiliary light sources 120 may operate independently of each other.

Alternatively, all the light sources may be operated individually or independently of one another.

The growth light source 110 of the light source module 11 according to this embodiment may emit white light as the growth light.

Referring to FIG. 14, the growth light emitted from the growth light source 110 may be white light having a similar spectrum to sunlight. In some forms, the spectrum of the light emitted from the growth light source 110 may have at least four peak wavelengths. For example, the light emitted from the growth light source 110 and delivered to the plant may have spectral characteristics in which peaks are located in the wavelength ranges of about 430 nm or less, about 440 nm to about 460 nm, about 510 nm to about 530 nm, and about 600 nm to about 630 nm, respectively.

The auxiliary light source 120 of the light source module 11 according to this embodiment may emit UV light as the auxiliary light. The auxiliary light emitted from the auxiliary light source 120 may be any kind of UV light that can increase the phytochemical content of the plant. For example, the auxiliary light from the auxiliary light source 120 may be UV light having a peak in the wavelength range of 280 nm and 320 nm.

Respective auxiliary light sources of light source modules according to other embodiments of the present disclosure described below are the same as the auxiliary light source of the light source module 11 according to the first embodiment.

The light emitted from the light source module 11 according to this embodiment includes the growth light emitted from the growth light source 110 and the auxiliary light emitted from the auxiliary light source 120. Thus, the light source module 11 according to the first embodiment may supply the plant with light having the spectral characteristics shown in FIG. 15.

Figure 16:
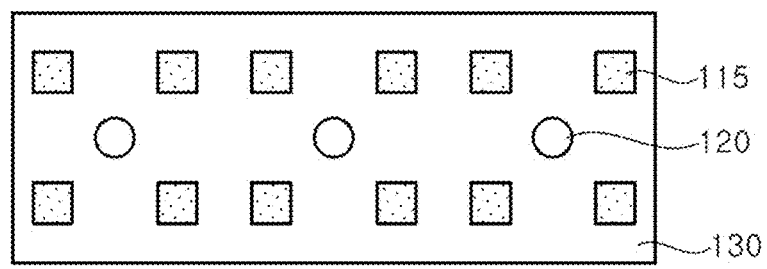
FIG. 16 is a schematic view of a light source module according to a second embodiment of the present disclosure.
Figure 17:
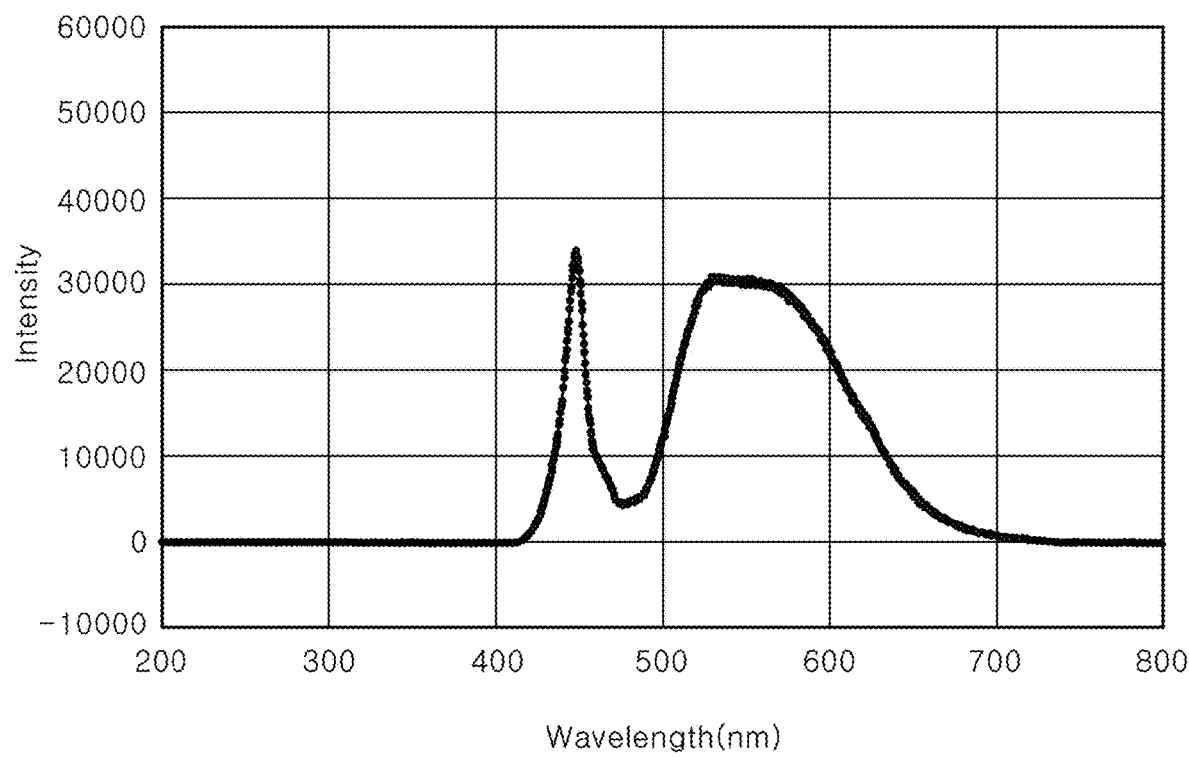
FIG. 17 is a spectrum of light emitted from a growth light source of the light source module according to the second embodiment.
Figure 18:
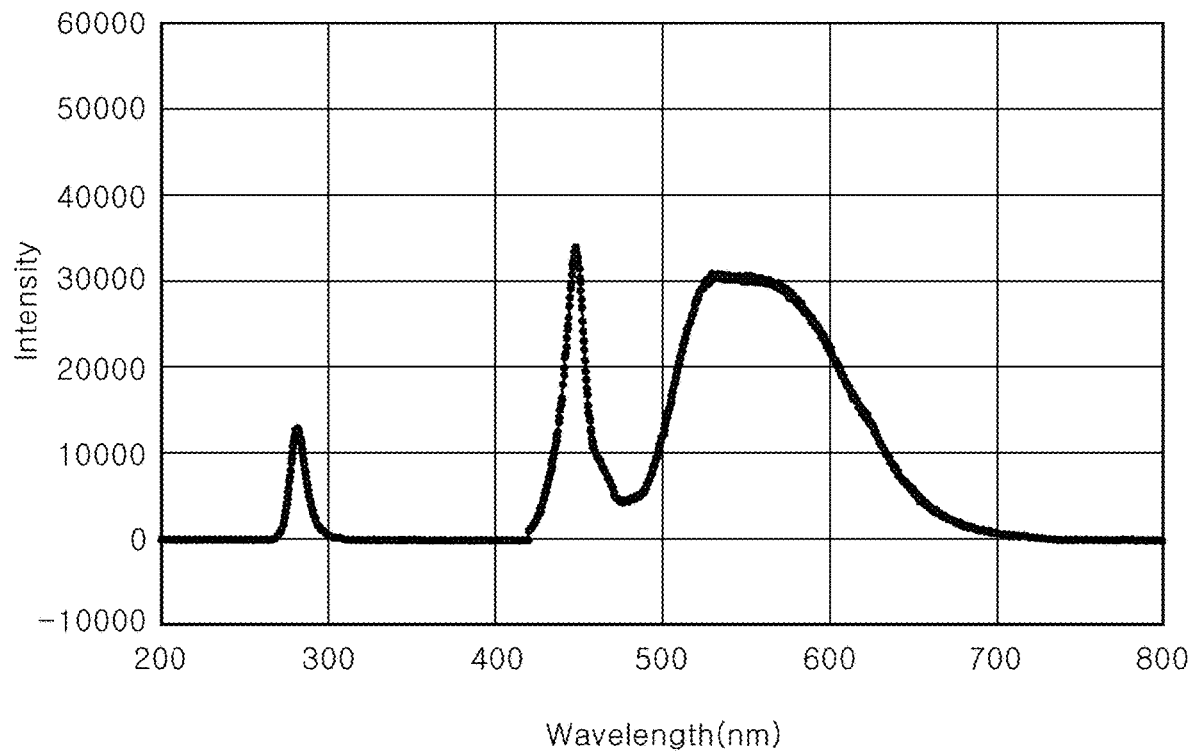
FIG. 18 is a spectrum of light emitted from the light source module according to the second embodiment.

FIG. 16 to FIG. 18 are exemplary views illustrating characteristics of a light source module according to a second embodiment of the present disclosure.

FIG. 16 is a schematic view of a light source module 12 according to the second embodiment of the present disclosure. FIG. 17 is a spectrum of light emitted from a growth light source 115 of the light source module 12 according to the second embodiment. FIG. 18 is a spectrum of light emitted from the light source module 12 according to the second embodiment.

Referring to FIG. 16, the light source module 12 according to the second embodiment may include a substrate 130, a growth light source 115, and an auxiliary light source 120.

Growth light emitted from the growth light source 115 of the light source module 12 according to this embodiment may be white light.

Here, the growth light emitted from the growth light source 115 of the light source module 12 according to this embodiment may have different spectral characteristics than the growth light emitted from the growth light source of the light source module according to the first embodiment.

Referring to FIG. 17, the growth light source 115 according to the second embodiment may emit white light having a peak in the wavelength range of 400 nm to 500 nm.

In addition, the auxiliary light source 120 of the light source module 12 according to this embodiment is the same as the auxiliary light source of the light source module according to the first embodiment.

The light source module 12 according to the second embodiment may emit light having the spectral characteristics shown in FIG. 18.

Figure 19:
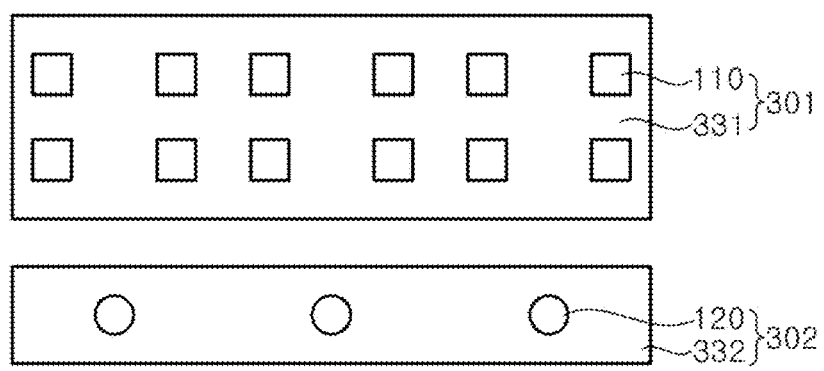
FIG. 19 is a schematic view of a light source module according to a third embodiment of the present disclosure.

FIG. 19 is a schematic view of a light source module according to a third embodiment of the present disclosure.

Referring back to FIG. 13 and FIG. 16, in the light source modules according to the first embodiment and the second embodiment, both the growth light source and the auxiliary light source are mounted on the same substrate. The light source module 13 according to the third embodiment has a structure in which a growth light source 110 and an auxiliary light source 120 are disposed on different substrates.

Referring to FIG. 19, the light source module 13 according to this embodiment may include a first light source module 301 and a second light source module 302. The first light source module 301 may include a first substrate 331 and a growth light source 110. The growth light source 110 according to this embodiment may be the same as the growth light source of the light source module according to the first embodiment or the second embodiment.

That is, the first light source module 301 may emit growth light having the spectral characteristics shown in FIG. 14 or FIG. 17.

The second light source module 302 may include a second substrate 332 and an auxiliary light source 120 emitting UV light as auxiliary light.

The light source module 13 according to the third embodiment differs in the arrangement of the light sources from the light source module according to the first embodiment or the second embodiment. Thus, the light source module 13 according to the third embodiment emits light having the same spectral characteristics as the light emitted from the light source module according to the first embodiment or the second embodiment.

Thus, the light source module 13 according to the third embodiment may supply barley sprout with light having the spectral characteristics shown in FIG. 15 or 18.

Figure 20:
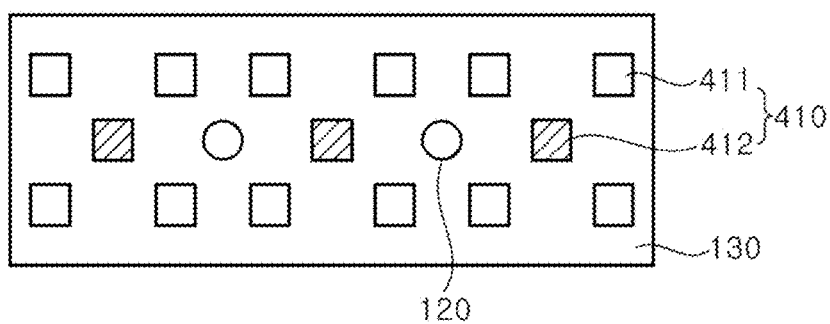
FIG. 20 is a schematic view of a light source module according to a fourth embodiment of the present disclosure.
Figure 21:
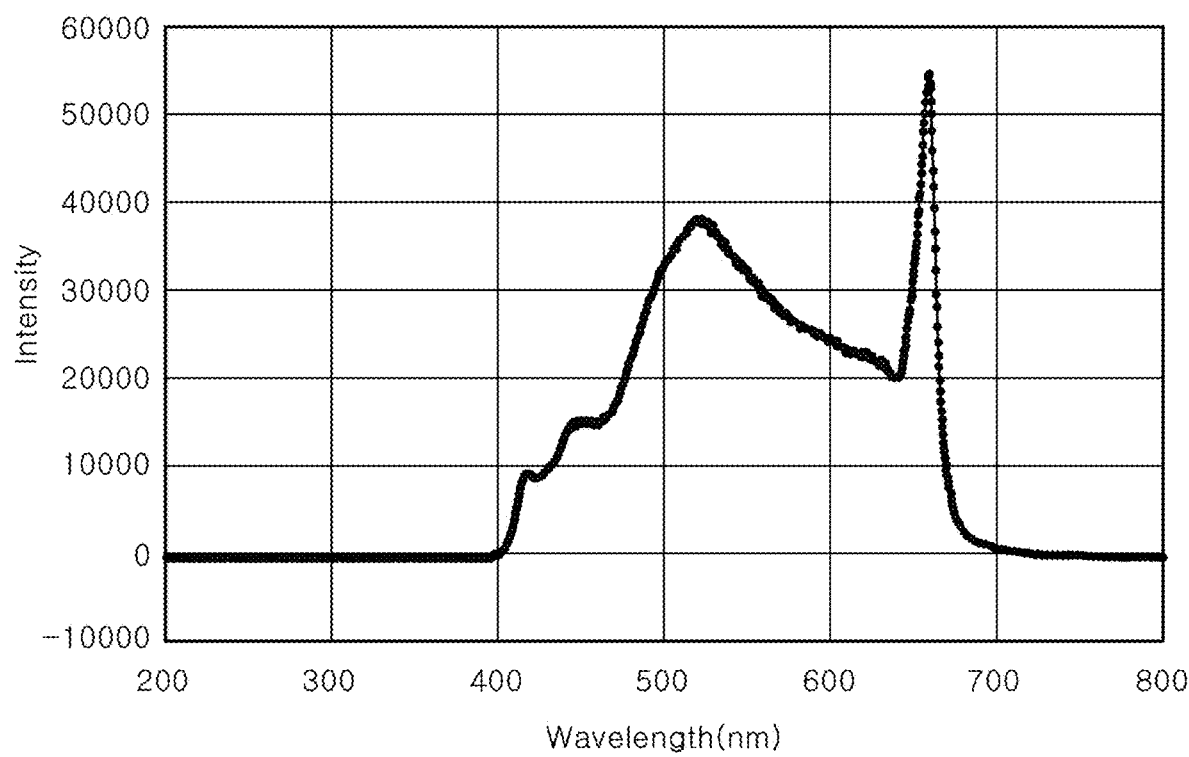
FIG. 21 is a spectrum of light emitted from a growth light source of the light source module according to the fourth embodiment.
Figure 22:
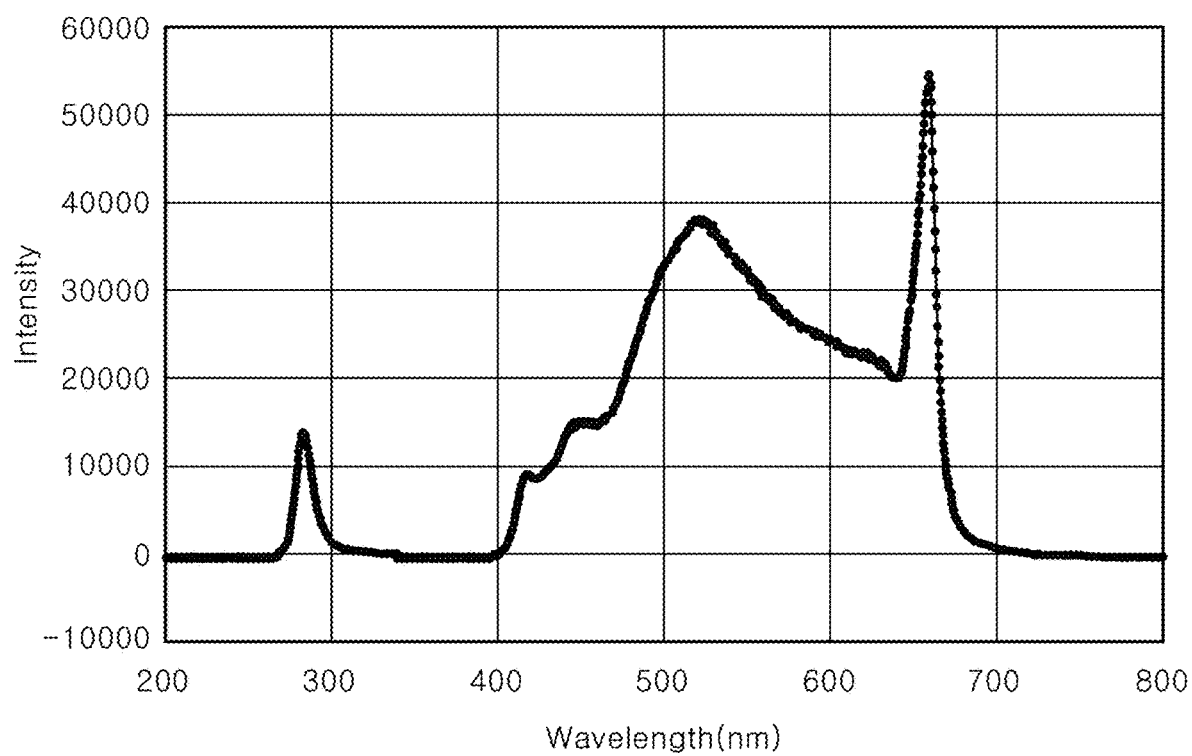
FIG. 22 is a spectrum of light emitted from the light source module according to the fourth embodiment.

FIG. 20 to FIG. 22 are exemplary views illustrating characteristics of a light source module according to a fourth embodiment of the present disclosure.

FIG. 20 is a schematic view of a light source module 14 according to the fourth embodiment of the present disclosure. FIG. 21 is a spectrum of light emitted from a growth light source 410 of the light source module 14 according to the fourth embodiment. FIG. 22 is a spectrum of light emitted from the light source module 14 according to the fourth embodiment.

Referring to FIG. 20, the light source module 14 according to the fourth embodiment may include a substrate 130, a growth light source 410, and an auxiliary light source 120. Here, the growth light source 410 may include a first growth light source 411 and a second growth light source 412.

The first growth light source 411 may emit white light. For example, the first growth light source 411 may emit white light having the same spectral characteristics as the white light emitted from the growth light source of the light source module according to the first embodiment. In addition, the second growth light source 412 may emit red light having a peak in the wavelength range of 600 nm to 700 nm.

Thus, the growth light source 410 of the light source module 14 according to this embodiment may emit growth light in which the light emitted from the first growth light source 411 is mixed with the light emitted from the second growth light source 412. For example, the growth light source 410 of the light source module 14 according to this embodiment may emit growth light having the spectral characteristics shown in FIG. 21. Thus, the light source module 14 according to this embodiment may emit light in which the mixed light of the white light and the red light as the growth light is mixed with UV light as the auxiliary light. For example, the light source module 14 according to this embodiment may supply barley sprout with light having the spectral characteristics shown in FIG. 22.

Referring to FIG. 20, the light source module 14 according to the fourth embodiment may have a structure in which the first growth light source 411, the second growth light source 412, and the auxiliary light source 120 are all mounted on a single substrate 130. In addition, each of the second growth light sources 412 may be disposed between the first growth light sources 411, as shown in FIG. 20. Further, each of the auxiliary light sources 120 may be disposed between the second growth light sources 412.

However, it will be understood that the present disclosure is not limited thereto and the numbers and arrangement of first growth light sources 411, second growth light sources 412, and auxiliary light sources 120 may vary as needed.

Figure 23:
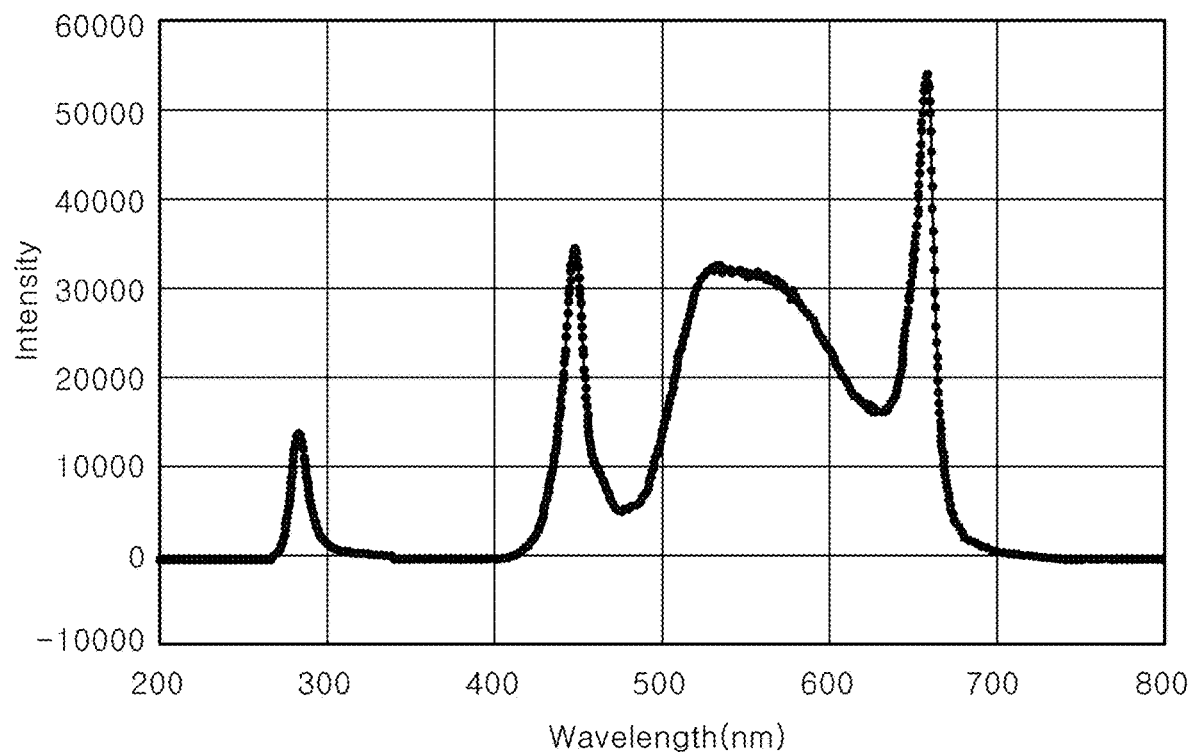
FIG. 23 is a spectrum of light emitted from a light source module according to a fifth embodiment of the present disclosure.

FIG. 23 is a spectrum of light emitted from a light source module according to a fifth embodiment of the present disclosure.

Light emitted from a second growth light source 412 and an auxiliary light source of the light source module according to the fifth embodiment may be the same as the light emitted from the second growth light source and the auxiliary light source of the light source module according to the fourth embodiment.

However, light emitted from a first growth light source of the light source module according to the fifth embodiment may be different from the light emitted from the light source module according to the fourth embodiment.

For example, the first growth light source of the light source module according to the fifth embodiment may emit white light having the same spectral characteristics as the white light emitted from the growth light source of the light source module according to the second embodiment.

Thus, the light source module according to the fifth embodiment may supply barley sprout with light having the spectral characteristics shown in FIG. 23.

Figure 24:
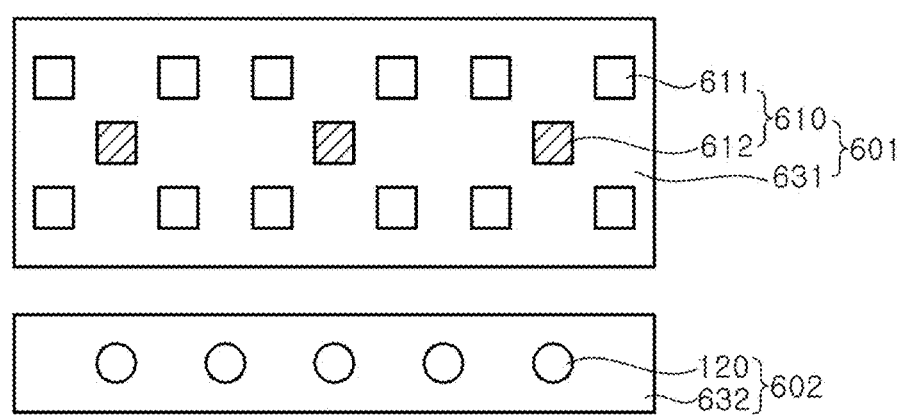
FIG. 24 is a schematic view of a light source module according to a sixth embodiment of the present disclosure.

FIG. 24 is a schematic view of a light source module according to a sixth embodiment of the present disclosure.

Referring to FIG. 24, the light source module 16 according to the sixth embodiment may include a first light source module 601 and a second light source module 602.

According to this embodiment, the first light source module 601 may include a first substrate 631 and a growth light source 610 mounted on the first substrate 631. In addition, the growth light source 610 may include a first growth light source 611 and a second growth light source 612. The second light source module 602 may include a second substrate 632 and an auxiliary light source 120 mounted on the second substrate 632.

The first growth light source 611, the second growth light source 612, and the auxiliary light source 120 of the light source module 16 according to the sixth embodiment may be the same as the first growth light source, the second growth light source, and the auxiliary light source of the light source module according to the fourth or fifth embodiment, respectively.

The light source module according to the fourth or fifth embodiment has a structure in which all the light sources are mounted on a single substrate, whereas the light source module 16 according to this embodiment has a structure in which the growth light source 610 and the auxiliary light source 120 are mounted on different substrates. That is, according to this embodiment, the first growth light source 611 and the second growth light source 612 are mounted on the first substrate 631 and the auxiliary light source 120 is mounted on the second substrate 632.

As such, despite having a different structure than the light source module according to the fourth or fifth embodiment, the light source module 16 according to the sixth embodiment may supply barley sprout with light having the same spectral characteristics as the light of FIG. 22 or FIG. 23.

Figure 25:
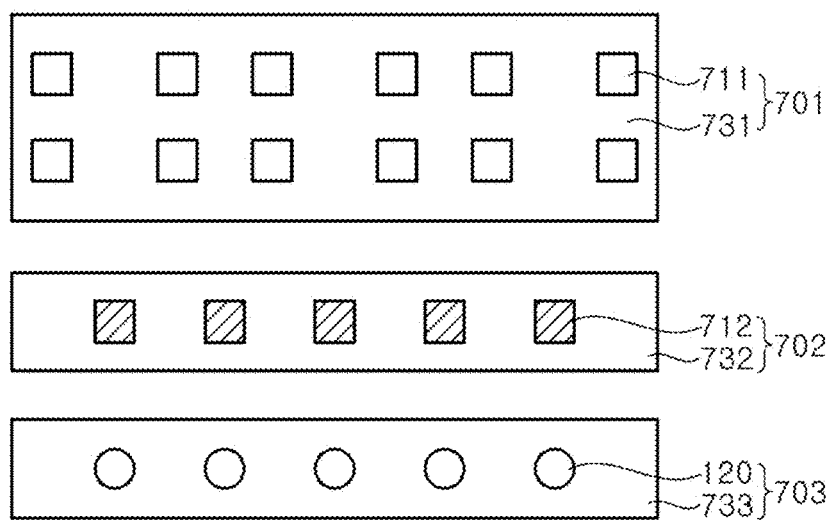
FIG. 25 is a schematic view of a light source module according to a seventh embodiment of the present disclosure.

FIG. 25 is a schematic view of a light source module according to a seventh embodiment of the present disclosure. Referring to FIG. 25, the light source module 17 according to the seventh embodiment may include a first light source module 701, a second light source module 702, and a third light source module 703.

The first light source module 701 includes a first substrate 731 and a first growth light source 711 mounted on the first substrate 731. The second light source module 702 includes a second substrate 732 and a second growth light source 712 mounted on the second substrate 732. The third light source module 703 includes a third substrate 733 and an auxiliary light source 120 mounted on the third substrate 733. That is, as shown in FIG. 25, the light source module 17 according to this embodiment has a structure in which different types of light sources are mounted on different substrates.

Here, the first growth light source 711, the second growth light source 712, and the auxiliary light source 120 are the same as the first growth light source, the second growth light source, and the auxiliary light source of the light source module according to the fourth or fifth embodiment, respectively.

Thus, despite having a different structure than the light source module according to the fourth or fifth embodiment, the light source module 17 according to the seventh embodiment may supply barley sprout with light having the same spectral characteristics as the light of FIG. 22 or FIG. 23.

Figure 26:
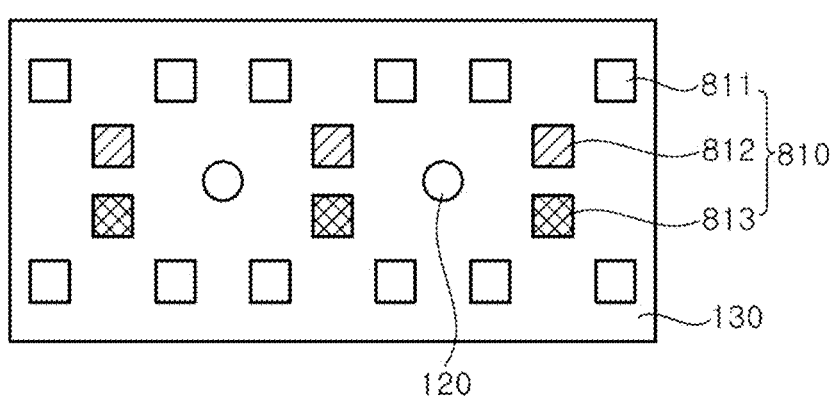
FIG. 26 is a schematic view of a light source module according to an eighth embodiment of the present disclosure.
Figure 27:
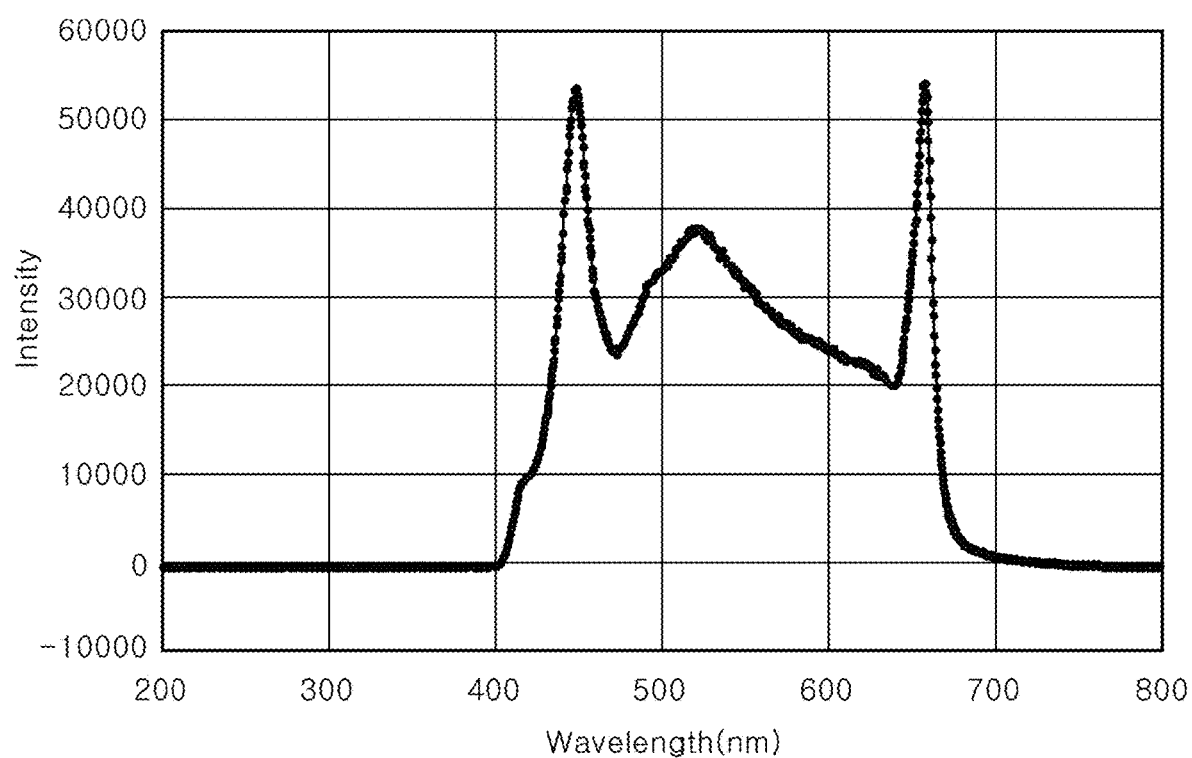
FIG. 27 is a spectrum of light emitted from a growth light source of the light source module according to the eighth embodiment.
Figure 28:
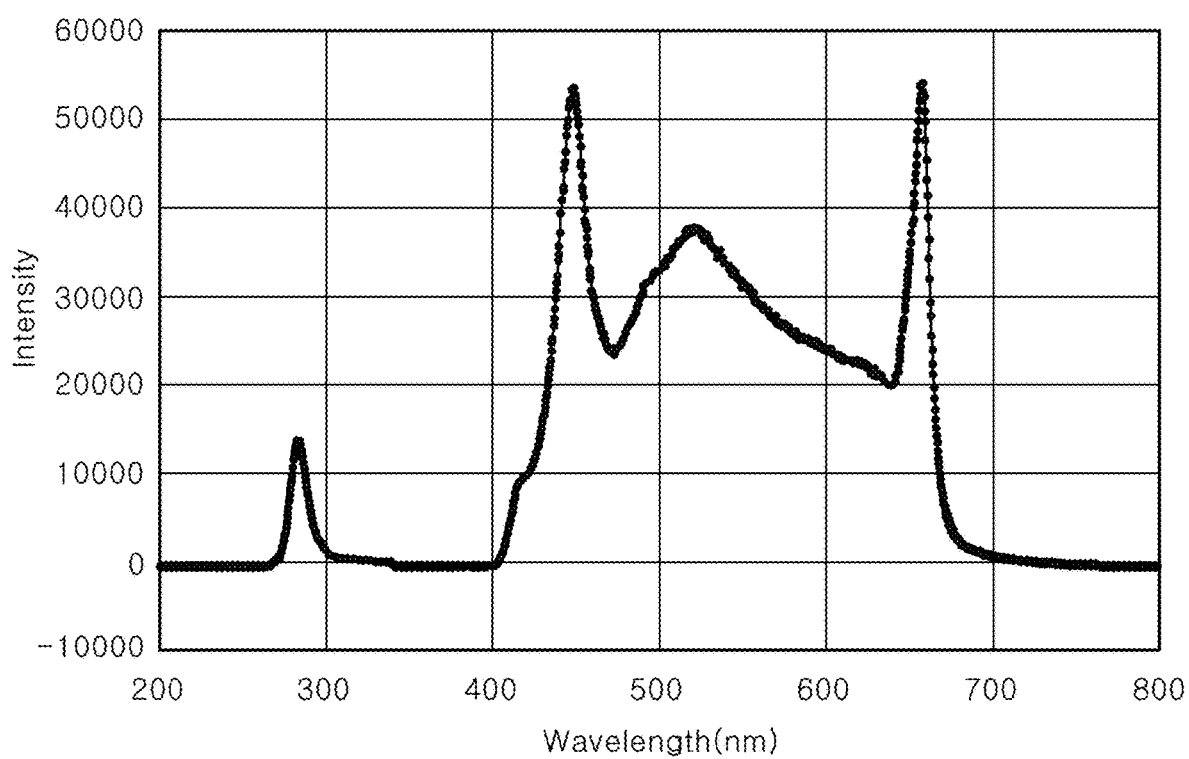
FIG. 28 is a spectrum of light emitted from the light source module according to the eighth embodiment.

FIG. 26 to FIG. 28 are exemplary views illustrating characteristics of a light source module according to an eighth embodiment. FIG. 26 is a schematic view of a light source module 18 according to the eighth embodiment of the present disclosure. FIG. 27 is a spectrum of light emitted from a growth light source 810 of the light source module 18 according to the eighth embodiment. FIG. 28 is a spectrum of light emitted from the light source module 18 according to the eighth embodiment.

Referring to FIG. 26, the light source module 18 according to the eighth embodiment may include a substrate 130, a growth light source 810, and an auxiliary light source 120. Here, the growth light source 810 may include a first growth light source 811 emitting white light, a second growth light source 812 emitting red light, and a third growth light source 813 emitting blue light.

As shown in FIG. 26, the light source module 18 according to this embodiment may have a structure in which the growth light source 810 and the auxiliary light source 120 are mounted on the same substrate 130. Alternatively, the light source module 18 according to this embodiment may have a structure in which the growth light source 810 and the auxiliary light source 120 are mounted on different substrates. Alternatively, the light source module 18 according to this embodiment may have a structure in which the first growth light source 811, the second growth light source 812, the third growth light source 813, and the auxiliary light source 120 are mounted on different substrates.

That is, the numbers and arrangement of first growth light sources 811, second growth light sources 812, third growth light sources 813, and auxiliary light sources 120 may vary as needed.

According to this embodiment, the first growth light source 811 may emit white light. In addition, the second growth light source 812 may emit red light having a peak in the wavelength range of 600 nm to 700 nm. Further, the third growth light source 813 may emit blue light having a peak in the wavelength range of 400 nm to 500 nm.

According to this embodiment, the growth light source 810 may emit growth light in which the white light is mixed with the red light and the blue light. Here, the white light may have the same spectral characteristics as the white light emitted from the growth light source of the light source module according to the first embodiment.

Thus, the growth light source 810 according to this embodiment may emit visible light having the spectral characteristics shown in FIG. 27. In this way, the light source module 18 according to the eighth embodiment may supply barley sprout with light having the spectral characteristics shown in FIG. 28.

Figure 29:
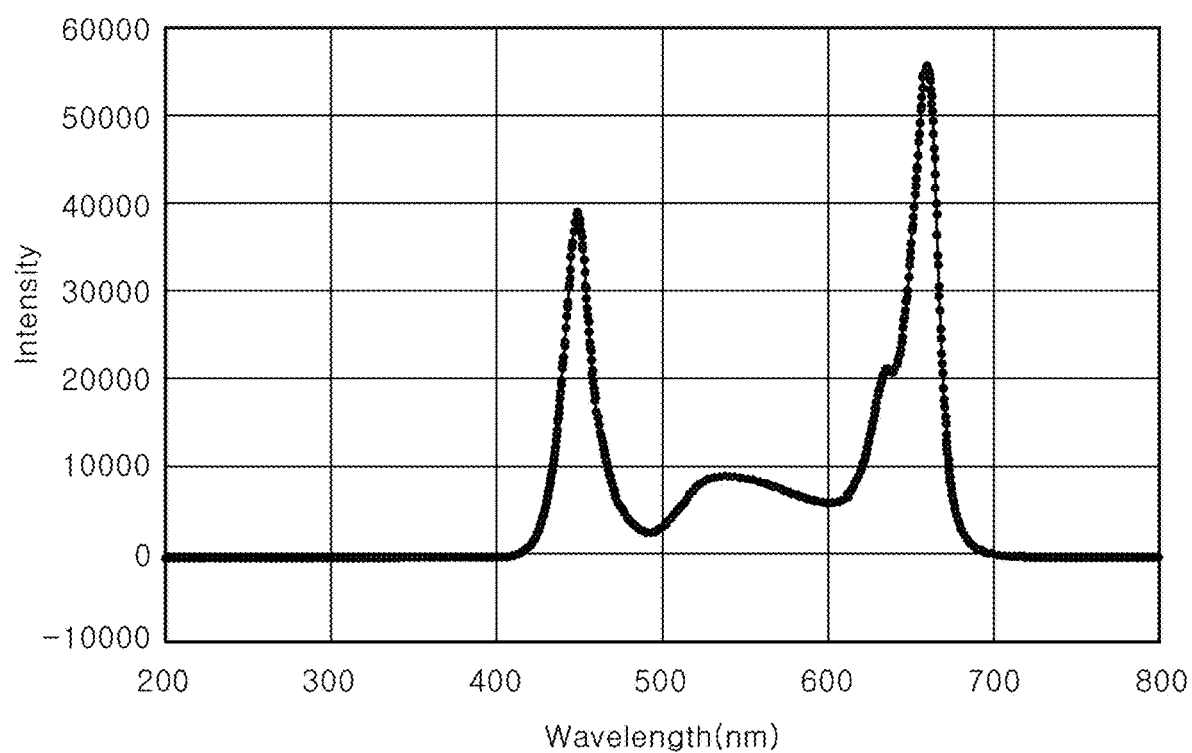
FIG. 29 is a spectrum of light emitted from a growth light source of a light source module according to a ninth embodiment.
Figure 30:
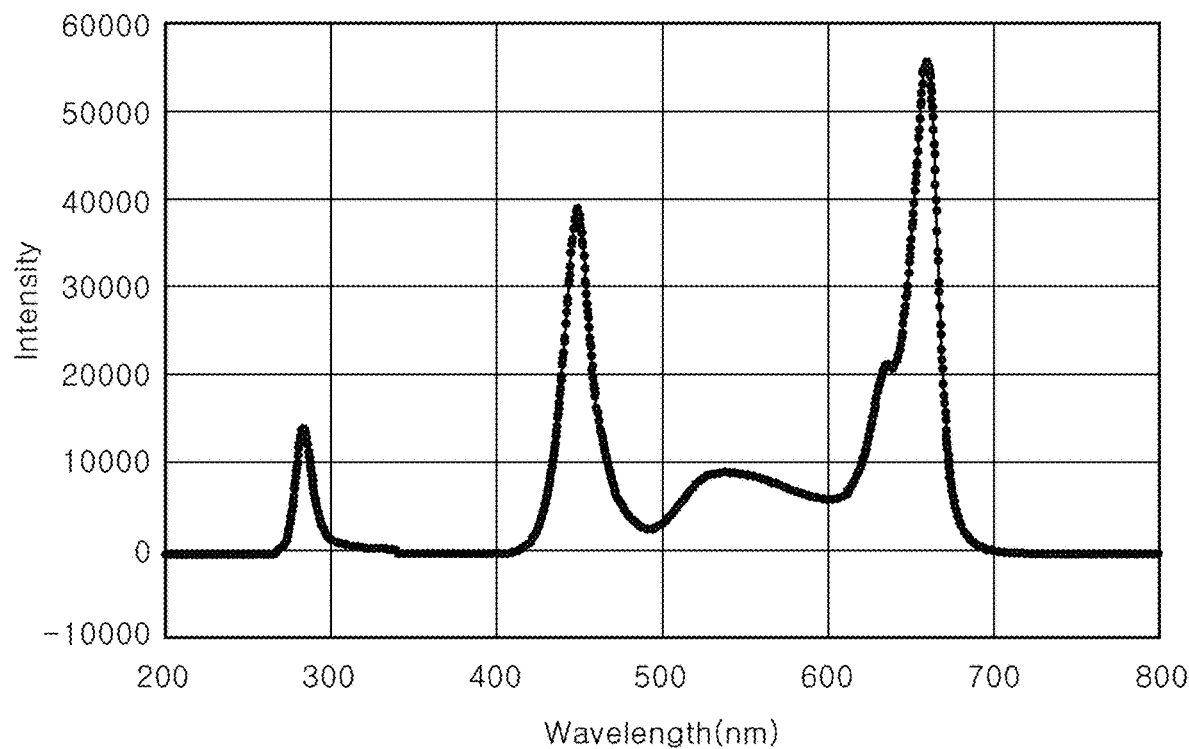
FIG. 30 is a spectrum of light emitted from the light source module according to the ninth embodiment.

FIG. 29 and FIG. 30 each show an optical spectrum related to a light source module according to a ninth embodiment of the present disclosure. FIG. 29 is a spectrum of light emitted from a growth light source of the light source module according to the ninth embodiment. FIG. 30 is a spectrum of light emitted from the light source module according to the ninth embodiment.

The light source module according to the ninth embodiment is the same as the light source module according to the eighth embodiment except that the light source module according to the ninth embodiment includes a first growth light source different from the first growth light source of the light source module according to the eighth embodiment.

For example, the first growth light source of the light source module according to this embodiment emits white light having the same spectral characteristics as the white light emitted from the growth light source of the light source module according to the second embodiment as shown in FIG. 17.

Thus, the growth light source according to this embodiment may emit growth light, which is visible light and the white light emitted from the growth light source of the light source module according to the second embodiment by mixing red light and blue light. That is, the growth light source of the light source module according to this embodiment may emit growth light having the spectral characteristics shown in FIG. 29. Thus, the light source module according to this embodiment may supply barley sprout with light having the spectral characteristics shown in FIG. 30.

Figure 31:
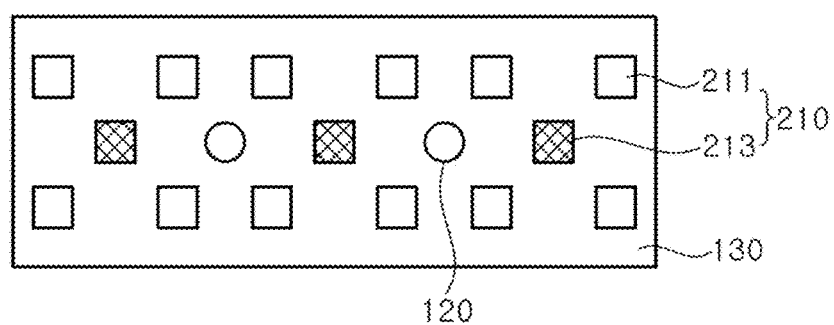
FIG. 31 is a schematic view of a light source module according to a tenth embodiment of the present disclosure.
Figure 32:
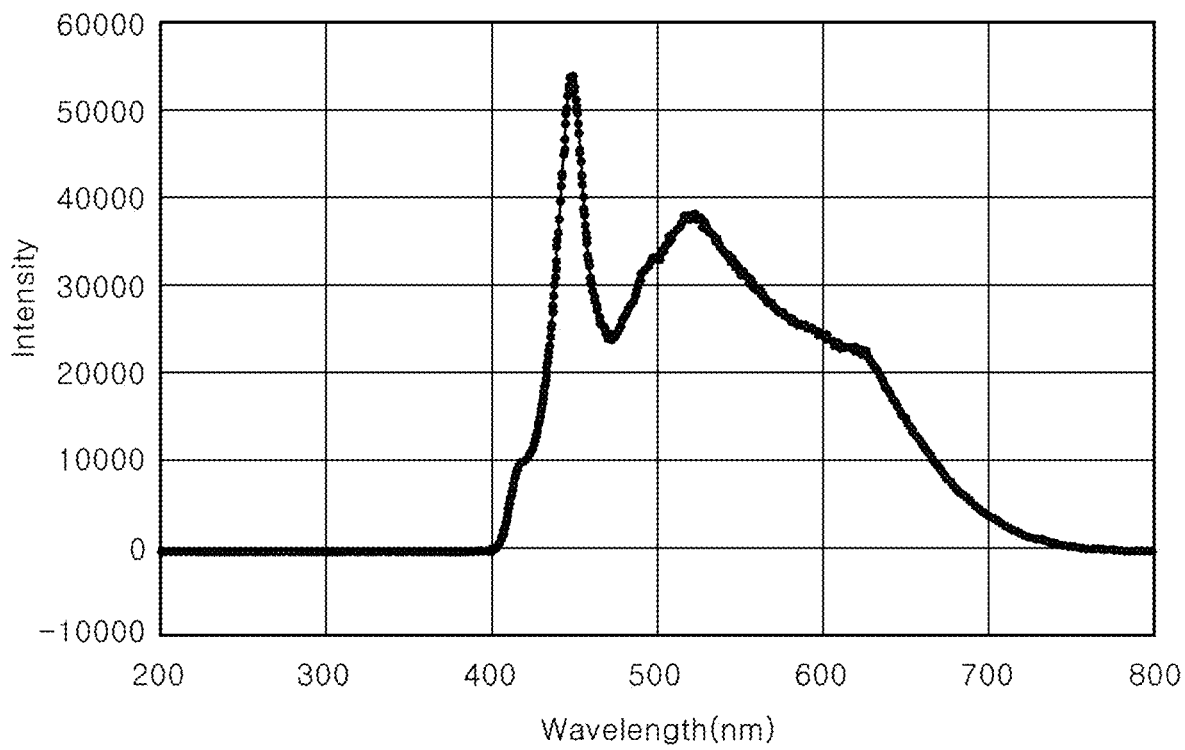
FIG. 32 is a spectrum of light emitted from a growth light source of the light source module according to the tenth embodiment.
Figure 33:
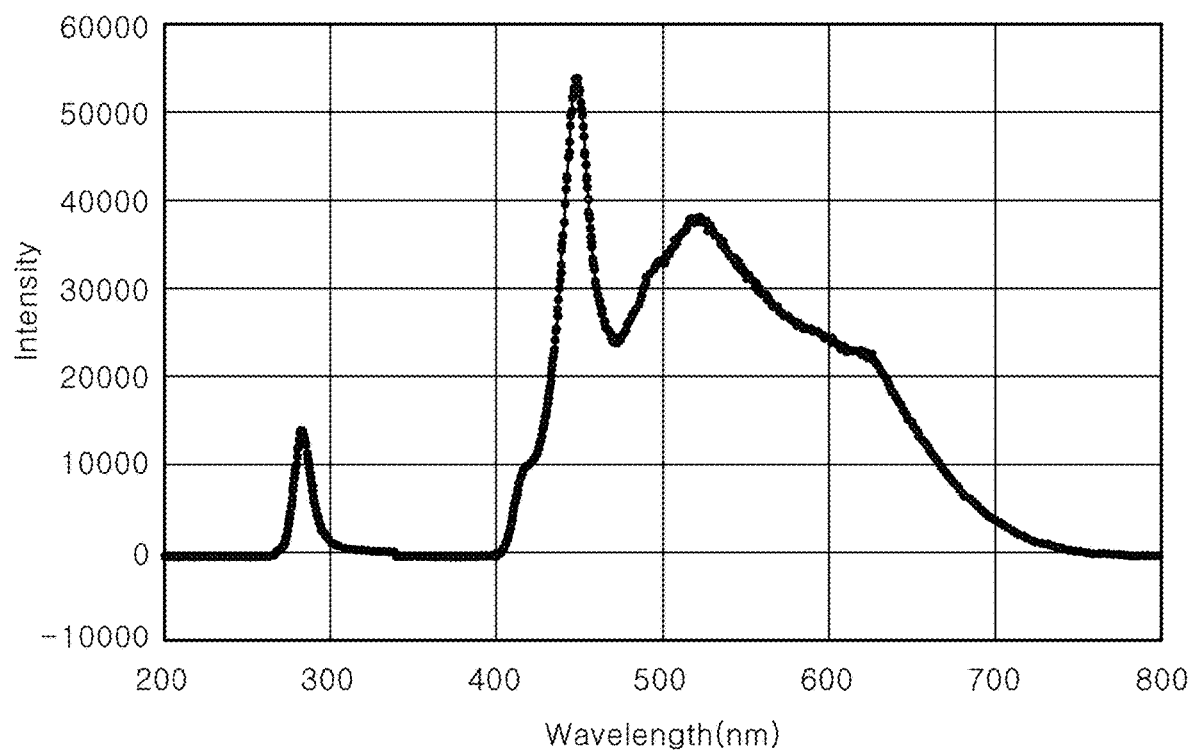
FIG. 33 is a spectrum of light emitted from the light source module according to the tenth embodiment.

FIG. 31 to FIG. 33 are exemplary views illustrating characteristics of a light source module according to a tenth embodiment. FIG. 31 is a schematic view of a light source module 20 according to the tenth embodiment of the present disclosure. FIG. 32 is a spectrum of light emitted from a growth light source 210 of the light source module 20 according to the tenth embodiment. FIG. 33 is a spectrum of light emitted from the light source module 20 according to the tenth embodiment.

Referring to FIG. 31, the light source module 20 according to the tenth embodiment may include a substrate 130, a growth light source 210, and an auxiliary light source 120.

Here, the growth light source 210 may include a first growth light source 211 emitting white light and a third growth light source 213 emitting blue light.

As shown in FIG. 31, the light source module 20 according to this embodiment may have a structure in which the growth light source 210 and the auxiliary light source 120 are mounted on the same substrate 130. Alternatively, the light source module 20 according to this embodiment may have a structure in which the growth light source 210 and the auxiliary light source 120 are mounted on different substrates. Alternatively, the light source module 20 according to this embodiment may have a structure in which the first growth light source 211, the third growth light source 213, and the auxiliary light source 120 are mounted on different substrates. As such, the numbers and arrangement of first growth light sources 211, third growth light sources 213, and auxiliary light sources 120 may vary as needed.

The first growth light source 211 according to this embodiment may emit white light. In addition, the third growth light source 213 according to this embodiment may emit blue light having a peak in the wavelength range of 400 nm to 500 nm. The growth light source 210 according to this embodiment may emit growth light in which the white light is mixed with the blue light. Here, the white light may have the same spectral characteristics as the white light emitted from the growth light source of the light source module according to the first embodiment.

Thus, the growth light source 210 according to this embodiment may emit visible light having the spectral characteristics shown in FIG. 32.

In this way, the light source module 20 according to the tenth embodiment can provide barley sprout with light having the spectral characteristics shown in FIG. 33.

Alternatively, as another example, the first growth light source 211 may emit white light having the same spectral characteristics as the white light emitted from the growth light source of the light source module according to the second embodiment.

In this example, the growth light source 210 of the light source module 20 according to the tenth embodiment may emit growth light in which the blue light is mixed with the white light emitted from the growth light source of the light source module according to the second embodiment (see FIG. 17).

In addition, light emitted from the light source module 20 may be a mixture of UV light as the auxiliary light, the blue light, and the white light emitted from the growth light source of the light source module according to the second embodiment (see FIG. 18).

With the light source module according to the various embodiments described above, the plant cultivation apparatus according to the present disclosure can improve the phytochemical content of a plant cultivated therein.

In addition, the plant cultivation apparatus and the light source module according to the present disclosure can increase the content of specific phytochemicals in a plant without sacrificing normal growth of the plant through adjustment of the cumulative light dose delivered to the plant.

Although some embodiments have been described herein, it should be understood that these embodiments are provided for illustration only and are not to be construed in any way as limiting the present disclosure. The scope of the present disclosure should be defined by the appended claims and equivalents thereto.

The invention claimed is:

1. A light source module comprising:
at least one substrate; and
at least one growth light source and at least one auxiliary light source disposed on the at least one substrate,
wherein the at least one growth light source is configured to emit growth light suitable for growing a selected plant,
the at least one auxiliary light source is configured to emit auxiliary light, the auxiliary light being UV light suitable for increasing a content of at least one phytochemical in the selected plant,
the growth light is white light, and
the at least one auxiliary light source is configured to supply the selected plant with the auxiliary light having a predetermined cumulative dose in an overall range from 0.3 kJ/m² to less than 20.2 kJ/m² during cultivation of the selected plant, wherein the predetermined cumulative dose is selected based on a selected type of the at least one phytochemical and a selected type of the selected plant.

2. The light source module according to claim 1, wherein the selected type of the at least one phytochemical is selected from a group of selectable types including a total phenolic content, an antioxidant capacity, lutonarin, saponarin.

3. The light source module according to claim 2, wherein the predetermined cumulative dose of the auxiliary light further includes:
a first range that is greater than 1.3 kJ/m² to less than 20.2 kJ/m² or
a second range that is from 2.7 kJ/m² to 13.4 kJ/m²; and
the first range or the second range of the predetermined cumulative dose of the auxiliary light is supplied during cultivation of the selected plant to increase the total phenolic content of the selected plant.

4. The light source module according to claim 2, wherein the predetermined cumulative dose further includes a third range that is greater than 2.7 kJ/m² to less than 20.2 kJ/m² or a fourth range that is from 4 kJ/m² to 13.4 kJ/m²; and
the third range or the fourth range of the predetermined cumulative dose of the auxiliary light is supplied during cultivation of the selected plant to increase the antioxidant capacity of the selected plant.

5. The light source module according to claim 2, wherein the predetermined cumulative dose further includes a second range that is greater than 2.7 kJ/m² to less than 13.4 kJ/m² or a fifth range that is from 4 kJ/m² to 8.1 kJ/m²; and
the second range or the fifth range of the predetermined cumulative dose of the auxiliary light is supplied during cultivation of the selected plant to increase a content of lutonarin in the selected plant.

6. The light source module according to claim 2, wherein the predetermined cumulative dose includes a sixth range that is from 0.3 kJ/m² to 13.4 kJ/m² and the sixth range of the predetermined cumulative dose of the auxiliary light is supplied during cultivation of the selected plant to increase a content of saponarin in the selected plant.

7. The light source module according to claim 1, wherein the at least one growth light source further comprises:
at least one first growth light source emitting the white light; and
at least one additional growth light source comprising:
at least one second growth light source emitting red light;
at least one third growth light source emitting blue light, or both.

8. The light source module according to claim 1, wherein the auxiliary light is UV light having a peak in a wavelength range of 280 nm to 320 nm.

9. The light source module according to claim 1, wherein the selected plant includes barley sprout.

10. A plant cultivation apparatus comprising:
a light source module configured to emit growth light and auxiliary light to a space for plant cultivation; and
a controller for controlling operation of the light source module;
wherein the light source module comprises:
at least one substrate; and
at least one growth light source and
at least one auxiliary light source disposed on the at least one substrate,
the at least one growth light source is configured to emit the growth light suitable for growing a selected plant,
the at least one auxiliary light source is configured to emit the auxiliary light, the auxiliary light being UV light suitable for increasing a content of at least one phytochemical in the selected plant,
the at least one growth light is white light, and
the at least one auxiliary light source is configured to supply the selected plant with the auxiliary light at a predetermined cumulative dose in an overall range from 0.3 kJ/m² to less than 20.2 kJ/m² during cultivation of the selected plant, wherein the controller is configured to select the predetermined cumulative dose based on a selected type of the at least one phytochemical and a selected type of the selected plant.

11. The plant cultivation apparatus according to claim 10, further comprising:
a tray supporting the selected plant during cultivation of the selected plant;
a moisture supply unit supplying moisture to the selected plant, or both.

12. The plant cultivation apparatus according to claim 10, wherein the selected type of the at least one phytochemical is selected from a group of selectable types including a total phenolic content, an antioxidant capacity, lutonarin, saponarin.

13. The plant cultivation apparatus according to claim 12, wherein the predetermined cumulative dose further includes a first range of greater than 1.3 kJ/m² to less than 20.2 kJ/m² or a second range that is from 2.7 kJ/m² to 13.4 kJ/m², and
the first range or the second range of the predetermined cumulative dose of the auxiliary light is supplied during cultivation of the selected plant to increase the total phenolic content of the selected plant.

14. The plant cultivation apparatus according to claim 12, wherein the predetermined cumulative dose further includes a third range of greater than 2.7 kJ/m² to less than 20.2 kJ/m² or a fourth range that is from 4 kJ/m² to 13.4 kJ/m², and
the third range or the fourth range of the predetermined cumulative dose of the auxiliary light is supplied during cultivation of the selected plant to increase the antioxidant capacity of the selected plant.

15. The plant cultivation apparatus according to claim 12, wherein the predetermined cumulative dose further includes a second range of greater than 2.7 kJ/m² to less than 13.4 kJ/m² or a fifth range that is from 4 kJ/m² to 8.1 kJ/m², and
the second range or the fifth range of the predetermined cumulative dose of the auxiliary light is supplied during cultivation of the selected plant to increase a content of lutonarin in the selected plant.

16. The plant cultivation apparatus according to claim 12, wherein the cumulative dose includes a sixth range that is from 0.3 kJ/m² to 13.4 kJ/m², and the sixth range of the predetermined cumulative dose of the auxiliary light is supplied during cultivation of the selected plant to increase a content of saponarin in the selected plant.

17. The plant cultivation apparatus according to claim 10, wherein the at least one growth light source comprises:
at least one first growth light source emitting the white light; and
at least one additional growth light source comprising:
at least one second growth light source emitting red light;
at least one third growth light source emitting blue light, or both.

18. The plant cultivation apparatus according to claim 10, wherein the auxiliary light is UV light having a peak in a wavelength range of 280 nm to 320 nm.

19. The plant cultivation apparatus according to claim 10, wherein the selected plant includes barley sprout.

20. A plant cultivation system comprising:
at least one substrate; and
at least one growth light source and at least one auxiliary light source disposed on the at least one substrate,
wherein the at least one growth light source is configured to emit growth light suitable for growing a selected plant,
the at least one auxiliary light source is configured to emit auxiliary light, the auxiliary light being UV light suitable for increasing a content of phytochemicals in the selected plant,
the at least one growth light is white light, and
the at least one auxiliary light source is configured to supply the selected plant with the auxiliary light at a predetermined cumulative dose of 0.3 kJ/m² to less than 20.2 kJ/m² during cultivation of the selected plant, wherein the predetermined cumulative dose is selected based on a selected type of the at least one phytochemical and a selected type of the selected plant;
wherein the at least one growth light source is arranged relative to the at least one auxiliary light source in a first pattern, and
the at least one growth light source and the at least one auxiliary light source are arranged relative to the at least one substrate in a second pattern.

* * * * *